(12) United States Patent
Ihara et al.

(10) Patent No.: US 11,332,367 B2
(45) Date of Patent: May 17, 2022

(54) HYDROGEN PRODUCING APPARATUS, METHOD FOR SEPARATING SOLID PRODUCT AND SYSTEM FOR DISCHARGING AND RECYCLING SOLID PRODUCT

(71) Applicant: Ihara Co., Ltd., Aichi (JP)

(72) Inventors: Ryoseki Ihara, Aichi (JP); Hiroyuki Amano, Aichi (JP); Yuji Suzuta, Aichi (JP)

(73) Assignee: IHARA CO., LTD., Aichi (JP)

( * ) Notice: Subject to any disclaimer, the term of this patent is extended or adjusted under 35 U.S.C. 154(b) by 0 days.

(21) Appl. No.: 17/049,022

(22) PCT Filed: Sep. 11, 2019

(86) PCT No.: PCT/JP2019/035790
§ 371 (c)(1),
(2) Date: Oct. 19, 2020

(87) PCT Pub. No.: WO2020/090245
PCT Pub. Date: May 7, 2020

(65) Prior Publication Data
US 2021/0246022 A1   Aug. 12, 2021

(30) Foreign Application Priority Data

Oct. 30, 2018 (JP) .............................. JP2018-203548

(51) Int. Cl.
C01B 3/26   (2006.01)
B01J 15/00   (2006.01)
B01J 23/755   (2006.01)
B01J 35/04   (2006.01)
B01J 35/06   (2006.01)

(52) U.S. Cl.
CPC .............. *C01B 3/26* (2013.01); *B01J 15/005* (2013.01); *B01J 23/755* (2013.01); *B01J 35/04* (2013.01); *B01J 35/06* (2013.01); *C01B 2203/0277* (2013.01); *C01B 2203/1058* (2013.01)

(58) Field of Classification Search
CPC ........ B01J 35/06; B01J 23/755; B01J 15/005; B01J 35/0013; B01J 25/02; B01J 35/04; B01J 8/005; B01J 8/007; B01J 19/00; B01J 2219/00; C01B 2203/0277; C01B 3/26; C01B 2203/1058; C01B 2203/02
See application file for complete search history.

(56) References Cited

U.S. PATENT DOCUMENTS

| | | | | |
|---|---|---|---|---|
| 3,342,751 A | * | 9/1967 | Hayes ................... | B01J 23/755 502/335 |
| 5,213,770 A | * | 5/1993 | Noyes ..................... | B01J 8/067 422/211 |
| 6,653,005 B1 | * | 11/2003 | Muradov ............... | B01J 8/0278 429/410 |
| 6,852,668 B2 | * | 2/2005 | de Lasa ................. | B01J 29/146 252/373 |
| 6,995,115 B2 | * | 2/2006 | Wang .................... | B01J 23/002 502/328 |
| 2006/0257310 A1 | | 11/2006 | Tada et al. | |
| 2009/0022654 A1 | | 1/2009 | Yamasaki | |
| 2009/0104109 A1 | | 4/2009 | Yamasaki | |
| 2014/0086820 A1 | | 3/2014 | Nakamura et al. | |

FOREIGN PATENT DOCUMENTS

| | | | |
|---|---|---|---|
| JP | 2001220103 A | 8/2001 | |
| JP | 200354904 A | 2/2003 | |
| JP | 200395605 A | 4/2003 | |
| JP | 200459340 A | 2/2004 | |
| JP | 2004261771 A | 9/2004 | |
| JP | 200696590 A | 4/2006 | |
| JP | 2006315891 A | 11/2006 | |
| JP | 200923859 A | 2/2009 | |
| JP | 2009102184 A | 5/2009 | |
| JP | 2012236727 A | 12/2012 | |
| JP | 201395616 A | 5/2013 | |
| JP | 2015209344 A | 11/2015 | |
| WO | WO 99 043 608 A1 | * 9/1999 | ............... C01B 3/26 |
| WO | WO 2007 100 333 A1 | * 9/2007 | ............ B01J 37/031 |

OTHER PUBLICATIONS

Kiyoshi Otsuka et al., "Production of Hydrogen through Decomposition of Methane with Ni-supported Catalysts" Chemistry Letters 1999, vol. 28, No. 11, 1179-1180, 2pp.
International Search Report in PCT/JP2019/035790, dated Jan. 28, 2020. 5pp.

* cited by examiner

*Primary Examiner* — Timothy C Vanoy
(74) *Attorney, Agent, or Firm* — Hauptman Ham, LLP

(57) ABSTRACT

To provide an apparatus and a system suitable for continuously and stably producing hydrogen by taking advantage of a direction composition reaction of hydrocarbons as well as a method for separating a solid product.
Provided are a hydrogen producing apparatus using a nickel-based metal structure for the direct decomposition reaction of hydrocarbons and a discharging and recovering system comprising: a depressurization chamber communicating with a lower opening of the reaction chamber of hydrogen producing apparatus 1 via a ventilation hole; a first valve capable of opening and closing said ventilation hole; a collection box communicating with the depressurization chamber via a channel; a second valve capable of opening and closing said depressurization chamber; and a depressurization pump communicating with the collection box.

7 Claims, 12 Drawing Sheets

HYDROGEN PRODUCING APPARATUS, METHOD FOR SEPARATING SOLID PRODUCT AND SYSTEM FOR DISCHARGING AND RECYCLING SOLID PRODUCT

CROSS REFERENCE

This application is a National Phase of International Application No. PCT/JP2019/035790 filed Sep. 11, 2019, and claims the benefit of priority from Japanese Patent Application No. 2018-203548, filed on Oct. 30, 2018.

TECHNICAL FIELD

The present disclosure relates to a hydrogen producing apparatus, a method for separating solid product and a system for discharging and recovering solid product.

BACKGROUND

For years, nickel is known as a catalytic metal to be used for the production of hydrogen gas by methane direct decomposition. To prevent aggregation due to the sintering of nickel fine particles in a high-temperature reaction of methane direct decomposition, what is proposed includes: nickel supported on a silica (Patent Document 1, Non-Patent Document 1), on a zeolite (Patent Document 2, Patent Document 3), on a titania (Patent Document 4) and nickels interposing a carbon particle (Patent Document 5).

In some instances a produced carbon in methane decomposition physically covers an active site of a catalyst, thereby deactivating the active site of the catalyst.

To avoid the inactivation of the nickel catalyst, there have been various proposals since the late 2000s. Regarding an apparatus utilizing a free-flowing nickel catalyst, for example, the proposals include a method of disposing a nanocarbon discharging channel at a side wall of a fluidized-bed reactor to cause the catalyst to overflow from the nanocarbon discharging channel and separating the catalyst mixed in an exhaust gas by a cyclone separator (Patent Document 6) and a method of agitating a mixture of a catalyst and a superfine powder carbon produced by use of a screw conveyor (Patent Document 7). In an apparatus using a free-flowing nickel catalyst, the free-flowing catalyst and a produced carbon are discharged in a mixed state. There is no separation of the nickel catalyst and the produced carbon.

In addition, in another proposal, a catalyst is filled on a shelf for catalyst disposed in a plural stages inside a reaction furnace. Proposed is a method for vibrating and rubbing catalysts together while rotating a shelf for catalyst in a reaction to shake off carbon adhered to the catalysts, recover the carbon and recycle the catalysts (Patent Document 8). Such a proposal would be difficult to execute because rotating a shelf for catalyst inside the furnace by use of a motor disposed outside the furnace in the reaction furnace heated at a high temperature, while maintaining airtightness is unlikely.

All the foregoing documents adopt a fluidized-bed reactor. Also in a fixed-bed reactor, there is a proposal to peel a precipitated carbon from a catalyst surface before the carbon grows builds up by intermittently supplying hydrocarbons and moisture to the reactor and simultaneously producing a low-temperature plasma (Patent Document 9). In this document, a fixed bed uses a large diameter particle with a diameter of 5 to 30 mm. The reference is silent about the specific material of the particle.

Additional proposals includes a method of causing low hydrocarbons and a low level of a coexisting gas such as carbon dioxide, oxygen, water and hydrogen to coexist and serve for the selective reaction of reacting a precursor of functional nanocarbons or by-product amorphous carbons produced on a catalyst by the reaction of low hydrocarbons to gasify and remove from the catalyst (Patent Document 10); and a method of causing a catalyst powder and a low hydrocarbon gas to flow in a reaction tube and recovering a carbon-precipitated catalyst powder and a decomposed produced gas for the purpose of continuous operation with high working efficiency and energy efficiency without the downtime for the replacement of the catalyst etc. (Patent Document 11) In the former method, a proper concentration of the coexisting gas is affected by various factors, and determining or controlling the concentration is difficult. To realize the latter method, an apparatus becomes large, which is not suitable for on-site gas station etc., and still does not provide enough room to study a specific apparatus configuration of a catalyst separation apparatus. Further, power is required to sustainably operate a catalyst separation apparatus such as cyclone separator, and thus maintenance cost for such an apparatus is significantly increased in comparison with other approaches.

PRIOR ART DOCUMENT

Patent Literature

[Patent Document 1] Japanese Unexamined Patent Application Publication No. 2001-220103
[Patent Document 2] Japanese Unexamined Patent Application Publication No. 2003-95605
[Patent Document 3] Japanese Unexamined Patent Application Publication No. 2003-54904
[Patent Document 4] Japanese Unexamined Patent Application Publication No. 2004-59340
[Patent Document 5] Japanese Unexamined Patent Application Publication No. 2004-261771
[Patent Document 6] Japanese Unexamined Patent Application Publication No. 2012-236727
[Patent Document 7] Japanese Unexamined Patent Application Publication No. 2013-95616
[Patent Document 8] Japanese Unexamined Patent Application Publication No. 2009-23859
[Patent Document 9] Japanese Unexamined Patent Application Publication No. 2015-209344
[Patent Document 10] Japanese Unexamined Patent Application Publication No. 2006-315891
[Patent Document 11] Japanese Unexamined Patent Application Publication No. 2006-96590

Non-Patent Literature

[Non-Patent Literature 1] Chemistry Letters Vol. 28 (1999) No. 11 p. 1179-1180

SUMMARY

As aforementioned, various attempts are made, however, there is no technique to stably produce hydrogen for a long period while reducing or preventing the deactivation of catalyst in an apparatus using the direct decomposition reaction of methane. Such a technique attracts more and more attention due to the growing demand of hydrogen including the utilization of heat produced by the combustion of gas containing hydrogen in boiler, the utilization of heat caused by combustion or the utilization of combustion for power generation in gas turbine, small and medium-sized on-site hydrogen stations and solid-oxide fuel cells.

In view of the above current situation, an object of the present disclosure is to provide an apparatus and a system suitable for continuously and stably producing hydrogen by utilizing a direction composition reaction of hydrocarbons such as methane as well as a method for separating solid product.

An aspect of the present disclosure made for helping to achieve the above object is a hydrogen producing apparatus using a nickel-based metal structure for the direct decomposition reaction of hydrocarbons. Such apparatus includes a metal structure. Thus for example, even in a case that the adhesion of a solid product in a direct decomposition reaction of hydrocarbons should result in the decreased catalytic performance of a nickel-based metal, the separation is easier compared to a powder catalyst and a variety of methods may be adopted for the separation method. Further, unlike the case of using a steam-reforming reaction, the separation and recovering processes of carbon dioxide ($CO_2$) are unnecessary. Therefore, the metal structure may be effective for a distributed system utilizing hydrogen such as on-site hydrogen station. The catalyst exhibits less deterioration even after the repetitive operation and non-operation of the apparatus to make the apparatus have reduced maintenance costs.

In the hydrogen producing apparatus, a nickel-based metal structure may include an exposed, unsupported-type nickel-containing layer. The above configuration comprises an exposed, unsupported-type nickel-containing layer that allows a produced carbon to function as a catalyst for a relatively long period even if a catalytic surface of the layer should be covered by a precipitated carbon and serves for the continuous operation of an apparatus. The above configuration may surprisingly maintain the activity of the catalyst in comparison to another nickel support method that has been routinely conducted for increasing an exposed surface area in a heterogeneous reaction involving nickel.

In the hydrogen producing apparatus, said nickel-based metal structure may include a structure selected from a plate, a porous body, a felt, a mesh, a fabric or an expanded metal. These structures have a little deformation even when a load is applied, and may maintain a certain shape by themselves as a whole. Furthermore, the separation of solid product is relatively easy compared to the case where a fluid catalyst is used.

In the hydrogen producing apparatus, nickel-based metal structure may include a porous surface. The above configuration allows for an increased surface area of a catalyst and makes the separation of a solid product easy.

The hydrogen producing apparatus may comprise a reaction chamber containing said nickel-based metal structure in which the direction decomposition reaction occurs and a compressor spraying a reaction gas or a produced gas toward said nickel-based metal structure. The above configuration allows the compressor to intermittently or continuously spray a reaction gas or a produced gas toward a nickel-based metal structure during the direct decomposition reaction near the nickel-based metal structure. The impact of the spraying may separate the adhered solid product from the structure. Thus the catalytic function may be recycled or maintained for a longer period in comparison with other approaches.

The hydrogen producing apparatus may cause a reaction gas to flow in a prescribed direction in a reaction chamber where a plurality of nickel-based metal structures are contained, wherein at least two specific nickel-based metal structures adjacent to each other may be configured to be disposed in a same direction in a same curvature viewed from a cross section vertical to said prescribed direction. In the above configuration, an apparent surface area of the catalyst becomes larger, and a gas may flow downward in a vertical direction at a uniform flow rate without causing the variation in flow rate between the two adjacent nickel-based metal structures, which may be particularly useful for a continuous reactor.

The above hydrogen producing apparatus comprises: a reaction chamber comprising a nickel-based metal structure and an impact applying member; a ventilation hole communicating inside and outside the reaction chamber; and a valve opening and closing said ventilation hole, wherein the impact applying member and the nickel-based metal structure are positioned in such a manner as to keep a gap when the ventilation hole is closed, whereas the impact applying member may touch the nickel-based metal structure due to the change in the gas pressure caused by discharging a gas filled in the reaction chamber to the outside of the reaction chamber when the ventilation hole is opened. In the above configuration, when opening a ventilation hole, an impact is intermittently applied to a nickel-based metal structure to separate the adhered solid product from the structure. Thus the catalytic function may be recycled or maintained for a longer period in comparison with other approaches.

The above hydrogen producing apparatus may be configured to comprise: a reaction chamber; a rack having a swinging fulcrum to allow for swinging in said reaction chamber while mounting said nickel-based metal structure; a cylinder having an introduction port of a reaction gas and a discharge port communicating with the reaction chamber; and a piston that defines a cylinder chamber together with said cylinder and allows for touching with said rack by sliding against said cylinder. In the above configuration, a force for swinging a rack is constantly or intermittently applied by supplying and discharging a reaction gas to the cylinder chamber to separate the adhered solid product from the structure. Thus, the catalytic function may be recycled or maintained for a long period. Reaction gas discharged from cylinder chamber may be utilized directly as a raw material of hydrogen in a reaction chamber, thus the reaction gas does not have an adverse effect on the reaction at all, let alone a problem of the mixture of air etc.

The hydrogen producing apparatus may include a rack associated with a piston in such a manner that said rack may impact a barrier fixed in said reaction chamber or an inner wall of said reaction chamber in a position where said cylinder chamber conducts through said discharge port. Such a configuration degases and reduces a gas pressure in a cylinder chamber, and overcomes the impact on a barrier or an inner wall in a reaction chamber in a position where said cylinder chamber does not communicate with said discharge port. Therefore, insofar as a reaction gas is supplied in a sustained manner to a cylinder up to a pressure at which the cylinder chamber communicates with said discharge port, the rack repeatedly shoves a barrier or an inner wall in a reaction chamber. The fine vibration allows the catalytic function of the nickel-based metal structure to be recycled and maintained for a longer period in comparison with other approaches.

An aspect of the present disclosure made for helping to achieve the above object is a method for separating a solid product adhered to a nickel-based metal structure in an apparatus in which said nickel-based metal structure is used for the direct decomposition reaction of a hydrocarbon, the method comprising the step of spraying a reaction gas and/or a produced gas toward said nickel-based metal structure held in a state of being separated from a bottom face in the apparatus. In the above method, a reaction gas or a produced gas is intermittently or continuously sprayed. The impact of the spraying may separate the adhered solid product from the structure. Thus, the catalytic function may be recycled or maintained for a longer period in comparison with other approaches.

An aspect of the present disclosure made for helping to achieve the above object is a method for separating a solid product adhered to a nickel-based metal structure in an apparatus in which said nickel-based metal structure is used for the direct decomposition reaction of a hydrocarbon, the method comprising conducting the direct decomposition reaction of a hydrocarbon in a condition that a gas pressure inside the apparatus installing said nickel-based metal structure is relatively higher than a gas pressure outside the apparatus to equalize a gas pressure inside and outside the apparatus at a desired timing and give an impact on said nickel-based metal structure directly or indirectly due to the change in gas pressure. The method may separate the adhered solid product from the structure at a timing releasing an inner pressure of the apparatus without any device driven by a motor in the operation of the apparatus. Thus the catalytic function may be recycled or maintained for a longer period in comparison with other approaches, while continuing the operation of the apparatus.

An aspect of the present disclosure made for helping to achieve the above object is a method for separating a solid product adhered to a nickel-based metal structure in an apparatus in which said nickel-based metal structure is used for the direct decomposition reaction of a hydrocarbon, the method comprising the steps of: disposing a rack capable of swinging in the apparatus; disposing a nickel-based metal structure on the rack; and applying an external force to said rack with a cylinder member driven by supplying and discharging a reaction gas. In the above configuration, a swinging is constantly or intermittently applied to the rack by the cylinder member driven by a reaction gas to separate the adhered solid product from the structure. Thus the catalytic function may be recycled or maintained for a long period, while continuing the operation of the apparatus.

An aspect of the present disclosure made for helping to achieve of the above object is a system for discharging and recovering a solid product produced in a reaction chamber by a direct decomposition reaction of a hydrocarbon using a nickel-based metal structure, comprising: a collection box communicating with an opening of said reaction chamber via a ventilation hole; a first valve capable of opening and closing said ventilation hole; and a depressurization pump disposed in a position that allows for reducing a gas pressure in said collection box when closing the first valve. The installation of the system into a hydrogen producing apparatus etc. allows us to discharge and recover solid product produced in a reaction chamber at any timing, while continuing the operation of the hydrogen producing apparatus without any device that requires the constant driving in the operation of the apparatus. Closing the first valve allows us to prevent the inflow of air or oxygen from the outside of the reaction chamber, while putting the inside of the reaction chamber in an explosion-proof environment.

The above discharging and recovering system may comprise a depressurization chamber on the way of a channel from said ventilation hole to said collection box and a second valve between said depressurization chamber and said collection box, wherein said depressurization pump communicates with said depressurization chamber and said collection box. In the system, solid product may be sequentially suctioned in the order of the opening of the reaction chamber, the depressurization chamber and the collection box for discharge and recovery. In this process, the depressurization chamber disposed between the reaction chamber and the collection box serves as a buffering space that improves the explosion protection. Further, the final gas pressure and temperature of the collection box may be decreased compared to the gas pressure and temperature of the reaction chamber. Thus the gas pressure is unlikely to cause solid product to be scattered outside when opening the collection box or detaching the collection box for transportation, which facilitates the recovering operation.

An aspect of the present disclosure made for helping to achieve the object is a system for discharging and recovering a solid product produced in the hydrogen producing apparatus, the system comprising: a depressurization chamber communicating with the reaction chamber via a ventilation hole; a depressurization pump communicating with the depressurization chamber; a valve for opening and closing said ventilation hole; and a collection box communicating with an opening at the bottom of said reaction chamber. The system is installed on hydrogen producing apparatus etc. so that the channel in the reaction chamber and the channel of solid product are separated from each other, which helps to prevent the clogging of ventilation hole or valve failure due to solid product.

Effect of the Invention

According to the present disclosure, a nickel-based metal structure is used. Thus even in a case that the adhesion of a solid product should result in the decreased catalytic performance of a nickel-based metal, the separation of the solid product is easier than a powder catalyst and a variety of methods may be adopted for the separation method.

BRIEF DESCRIPTION OF THE DRAWING(S)

DETAILED DESCRIPTION

Figure 1:
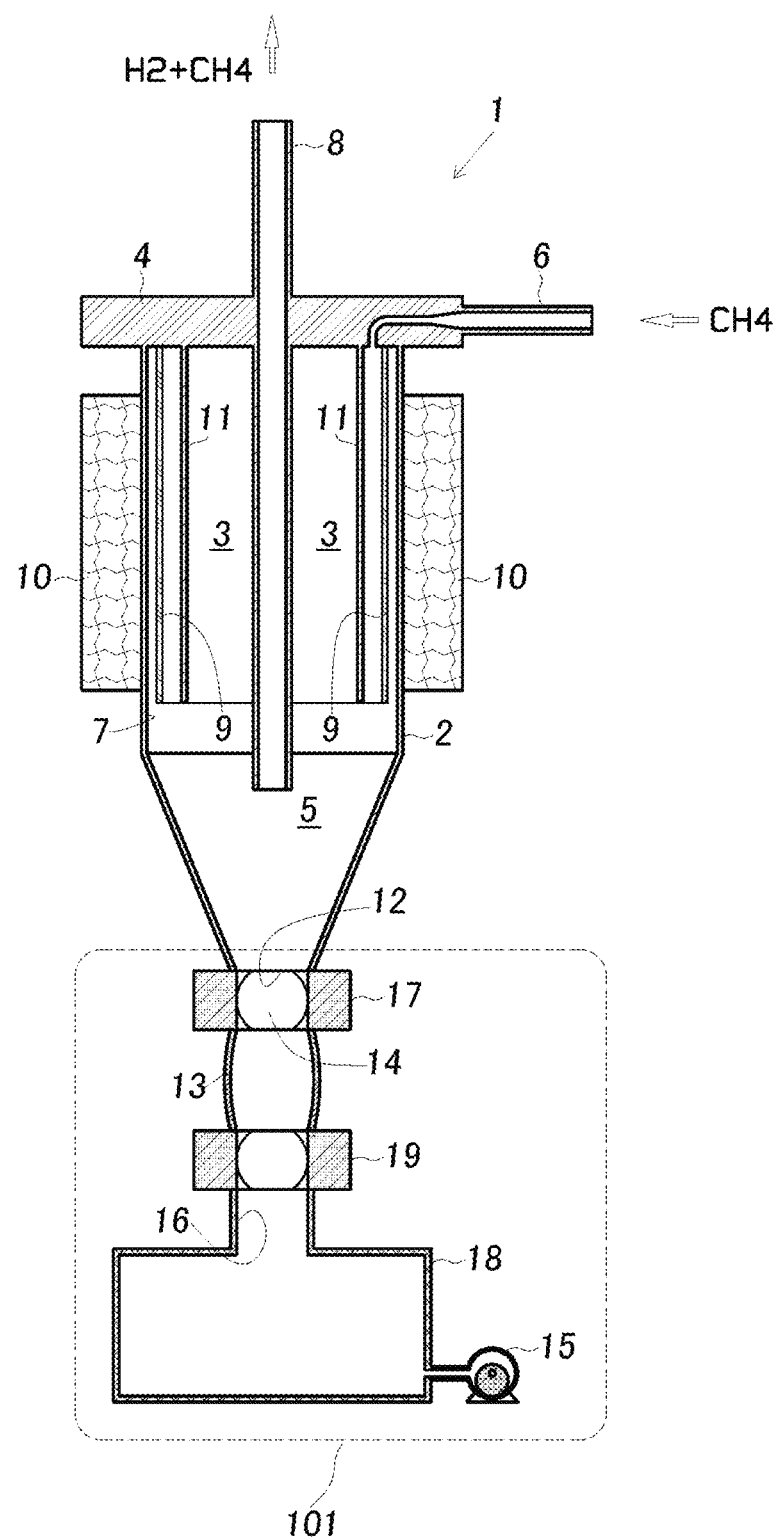
FIG. 1 is a schematic view of a hydrogen producing apparatus according to at least one embodiment.

An explanation is given to the embodiments of the present disclosure in reference to the following drawings.

A hydrogen producing apparatus of the present disclosure uses a nickel-based metal structure for the direct decomposition reaction of hydrocarbons.

"Nickel-based metal structure" of the specification is a structure comprising a nickel-based metal as a structural material on at least a part of an exposed surface.

"Nickel-based metal" used herein means a nickel element or a metal comprising nickel having a catalytic action on the direct decomposition reaction of hydrocarbons. Nickel-based metal may be nickel element or nickel alloy, including one or more metal selected from Rh, Ru, Ir, Pd, Pt, Re, Co and Fe in addition to nickel. Nickel-based metal may comprise permalloys having a nickel content greater than an iron content (e.g. permalloy A, permalloy C referred by JIS standard) as well as a part of permalloys containing more iron than nickel (e.g. permalloy B and permalloy D referred by JIS standard).

"Structure" used herein means an object that maintains a certain shape as a whole and fixes the position of constituent substances in the structure. A structure may include powders or particles as a raw material. In such a case, each position of powders or particles in a structure is fixed by sintering powders or particles to bond together.

In at least one embodiment, hydrocarbons introduced from a raw material gas supply port of the above hydrogen producing apparatus are linear hydrocarbons. In at least one embodiment, the raw material gas includes methane, ethane or propane. In at least one embodiment, the raw material gas includes methane.

Nickel-based metal structure may be a structure selected from a plate, a porous body, a felt, a mesh, a fabric or an expanded metal, or may have said structure as a substrate.

A plate may be formed into a single layer, otherwise a laminated plate including two or more layers of different materials, and may have a core-shell structure.

Porous body is a porous body having continuous pores. In at least one embodiment, a porous body has a three-dimensional network structure. In at least one embodiment, the pore size is 300 to 4000 μm. In at least one embodiment, the pore size is 400 to 3500 μm. The porosity may be 80% or more. In at least one embodiment, the porosity is 90% or more. In at least one embodiments, the porosity is 95% or more. The specific surface area may be 200 $m^2/m^3$ to 6000 $m^2/m^3$. In at least one embodiment, the specific surface area is 500 $m^2/m^3$ to 8500 $m^2/m^3$. The thickness of a porous body layer may be 1 mm to 15 mm. In at least one embodiment, the thickness of the porous body layer is 2 mm to 10 mm Representative porous body may include Celmet (registered trademark) by Sumitomo Electric Industries and Raney (registered trademark) nickel.

A felt is obtained by subjecting fibrous constituent materials to random entanglement and in some instances, sintering, which may include needle punched web and fibrous sintered body. Needle punched web and fibrous sintered body may have a fibrous diameter of 10 to 150 μm, a porosity of about 50 to 80%, a weight of 50 to 50000 $g/m^2$, and a thickness of 0.1 mm to 5.0 mm.

A mesh may be woven by any method including plain weave or twill weave, or knitted by any method including weft-knitting or warp-knitting by use of fibrous constituent materials, and causing the intersections to be adhered. Preferably-used mesh has a line diameter of 30 to 800 μm and a mesh number of 5 to 300 per inch.

A fabric is a knit connecting meshes to each other by an optional stitch.

An expanded metal is obtained by making cut lines in a metal plate at a predetermined interval in houndstooth pattern by a special machine and expanding the cut lines to form rhombic-shaped or testudinate meshes. Mesh size usually has a SW of 25 mm to 130 mm and a LW of 20 mm to 320 mm Strand size has a plate thickness of 1 mm to 8.5 mm and a W of 1.2 mm to 9.5 mm.

The structure may be one kind of the species listed above, or a composite structure combining two kinds or more.

Nickel-based metal structure may be formed on a substrate free from nickel-based metal. The substrate comprises a metal or a non-metal on a surface on which at least nickel-based metal structure is formed. The metal or non-metal may include, for example, stainless, aluminum, alumina or titanium etc.

The nickel-based metal structure may have an exposed, unsupported-type nickel-containing layer. "Unsupported" means that a catalytic component of nickel-based metal is not present as a particle distributed on a porous support such as active carbon and porous oxide, but is structurized and present. "Structurized" may include a state where particles are welded in a partial region, a state where particles are welded in a whole region, or a state where particles are melted as a whole and then cooled and solidified. Nickel-based metal structure may be structurized on the order of millimeters (mm). In at least one embodiment, the nickel-based metal structure may be structurized on the order of microns (μm). In at least one embodiment, the nickel-based metal structure may be structurized on the order of nanometers (nm).

Nickel-based metal structure may have a porous surface. Porous means at least any one of the following (A) to (C). (A) the porosity may be 80% or more. In at least one embodiment, the porosity is 90% or more. In at least one embodiment, the porosity is 95% or more. (B) the specific surface area may be 200 $m^2/m^3$ to 6000 $m^2/m^3$. In some embodiments, the specific surface area is 500 $m^2/m^3$ to 8500 $m^2/m^3$. (C) the thickness of surface layer may be 0.05 mm to 1 mm. In some embodiments, the thickness of the surface layer is 0.1 mm to 0.8 mm.

Nickel-based metal structure means that a nickel-containing layer is porous in a case that the nickel-containing layer is an exposed, unsupported nickel-containing layer having a porous surface. The substrate is not always porous, however, the substrate may be porous.

A method for producing the foregoing nickel-based metal structure may include the process to subject an original structure to heat spraying, porous plating, nickel plating and/or blast processing. Nickel-based metal structure may be produced by laminating a layer comprising nickel on a surface of an original structure usually by porous electroplating or nickel plating should the original structure be made of non-nickel metal. In at least one embodiment, the laminating is subsequently followed by blasting a nickel-based metal structure having a porous surface may be produced. On the other hand, if the original structure consists of nickel-based metal, a nickel-based metal structure having a porous surface may be produced by blasting. Nickel plating may be either electrolytic or electroless. The condition may be set as designed by a person ordinarily skilled in the art according to a desired thickness or a surface roughness. If the original structure is a nickel-aluminum alloy, a method of alkali dissolution treatment may be used.

In general, the original structure may be nickel-based metal structure or non-nickel-based metal structure, however, may be a core material to be removed by the following process. For example, a nickel-based metal foam may have a core material such as urethane foam, and may be produced by forming a nickel layer on a surface of the foam by electroplating, and removing a core material of a urethane foam by sintering.

Hereinafter, a detailed discussion is given to the examples of an apparatus utilizing the aforementioned nickel-based metal structure.

The hydrogen producing apparatus 1 of the present disclosure shown in FIG. 1 comprises: a reaction container 2 having a reaction section 3, a shooter section 5 and a lower opening 12 of reaction chamber; a lid 4 sealing the upper part of the reaction container 2; a raw material gas supplying pipe 6 penetrating through the interior portion of the lid from a side face to a bottom face of the lid 4 for introducing a raw material of hydrocarbon gas into the reaction section 3; a discharging pipe 8 penetrating the central part of the lid 4 and extending in a vertical direction so as to occupy the central part of the reaction section 3; a cylindrical nickel-based metal structure 9 having an opening at both ends, the metal structure being disposed along an inner wall 7 of the reaction container 2 so as to define a space of the reaction section 3; a gas flow-controlling cylinder 11 that increases the contact of the nickel-based metal structure 9 with a raw material gas in introducing the raw material gas into a space of the reaction section 3 via the raw material gas supplying pipe 6; and a heater 10 covering an outer wall of the reaction container 2 for heating the reaction section 3.

In the above hydrogen producing apparatus 1, the following method for separating solid product may be utilized. Specifically, (1) the method includes the step of spraying a reaction gas and/or a produced gas toward said nickel-based metal structure held in a state of being separated from a bottom face inside the apparatus. The method may be realized by attaching a tapered spraying nozzle (not shown) which tip is positioned between the inner wall 7 of the reaction container and the catalyst 9 in the reaction section 3 besides the raw material gas supplying pipe 6 and connecting the nozzle to a compressor (not shown) disposed outside the reaction container. In a case that a produced gas or a mixture of a reaction gas and the produced gas is ejected, the method may be realized by connecting a tube that introduces a part of the produced gas or the mixture of a reaction gas and the produced gas into the compressor.

The hydrogen producing apparatus 1 of FIG. 1 is connected to a system 101 for discharging and recovering a solid product produced by the direct decomposition reaction of a hydrocarbon using a nickel-based metal structure 9.

The discharging and recovering system 101 comprises: a depressurization chamber 13 communicating with a lower opening 12 of the reaction chamber of hydrogen producing apparatus 1 via a ventilation hole 14; a first valve 17 capable of opening and closing said ventilation hole 14; a collection box 18 communicating with the depressurization chamber 13 via a channel 16; a second valve 19 capable of opening and closing said depressurization chamber 13; and a depressurization pump 15 communicating with the collection box 18. In the system, the first valve 17 is installed at a lower opening 12 of the reaction chamber at the lowest point of the shooter section 5. Thus the lower opening 12 of the reaction chamber also serves as an exhaust port.

The system may discharge and recover a solid product in a manner that the solid product may slip over the shooter section 5 as necessary to be sequentially suctioned via the lower opening 12 of the reaction chamber, the depressurization chamber 13 and the collection box 18 while utilizing gravity, by a series of operations of: (A) closing the first valve 17 and opening the second valve 19; (B) reducing a gas pressure in the depressurization chamber 13 and the collection box 18 with the depressurization pump 15; (C) closing the second valve 19; (D) opening the first valve 17; (E) closing the first valve 17; and (F) opening the second valve 19.

Figure 5:
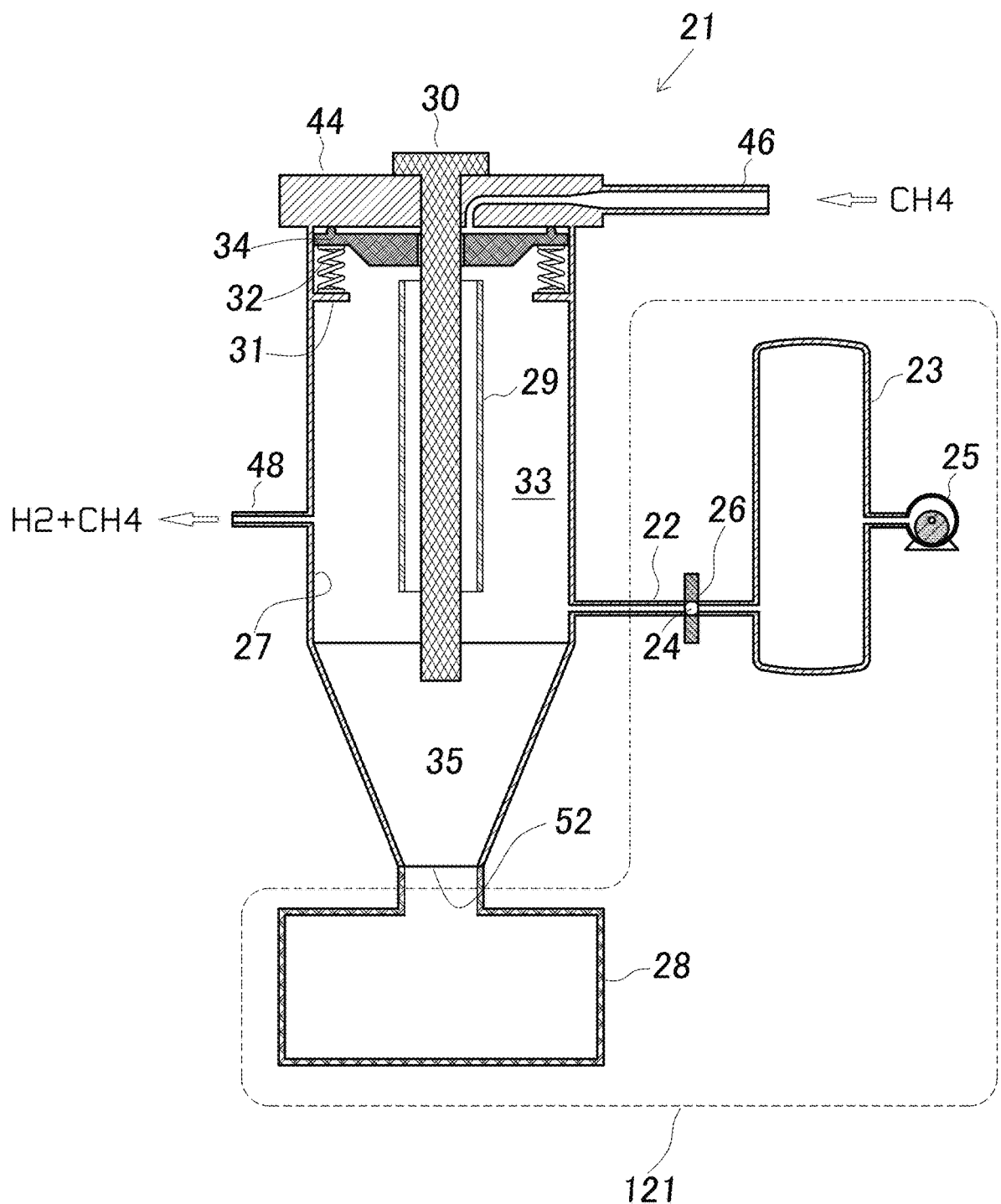
FIG. 5 is a schematic view of a hydrogen producing apparatus according to at least one embodiment.

In the hydrogen producing apparatus 21 shown in FIG. 5, heater 30 is extended in a vertical direction so as to penetrate through the center part of the lid 44 and occupy the center part of the reaction section 33, and a cylindrical nickel-based metal structure 29 is fixed around the heater 30, and further on the shelf 31 circularly disposed in the upper part of the inner wall 27 of the reaction container 2, the impact applying member 34 is supported via the spring 32 so as to be located at a level higher than the upper end of the nickel-based metal structure 29, whereas a horizontal first channel 22 is connected to the bottom part of the inner wall 27 of the reaction container 2 so as to communicate with the outside of the reaction container 2. The first channel 22 comprises the ventilation hole 24 and the valve 26 opening and closing the ventilation hole 24 therein.

In the above hydrogen producing apparatus 21, the following method for separating solid product may be utilized. Specifically, a method for separating a solid product adhered to a nickel-based metal structure. The method includes the steps of: (Step 2-1) conducting the direct decomposition reaction in a condition that a gas pressure inside the apparatus is relatively higher than a gas pressure outside the apparatus; and (Step 2-2) equalizing a gas pressure inside and outside the apparatus at a desired timing to give an impact on said nickel-based metal structure directly or indirectly due to the change in gas pressure.

In the direct decomposition reaction of (Step 2-1), as long as the reaction gas etc. may be introduced at a sufficient pressure in an apparatus. In some instances the gas flow is shut down from the inside to the outside of the apparatus. The shutdown of gas flow may be realized by closing the valve 26. On the other hand, the forced equalization of gas pressure inside and outside the apparatus at a desired timing in (Step 2-2) may be realized by instantaneously opening the closed valve 26.

"A state where a gas pressure inside an apparatus is relatively higher than a pressure outside the apparatus" may be +0.01 MPa to +0.5 MPa in general in terms of the difference in gas pressure. In at least one embodiment, the state where a gas pressure inside the apparatus may be higher than the pressure outside the apparatus +0.01 MPa to +0.2 MPa in terms of the difference in gas pressure. In at least one embodiment, the state where a gas pressure inside the apparatus may be higher than the pressure outside the apparatus +0.02 MPa to +0.1 MPa in terms of the difference in gas pressure. In at least one embodiment, the state where a gas pressure inside the apparatus may be higher than the pressure outside the apparatus +0.03 MPa to +0.08 MPa in terms of the difference in gas pressure. A difference in the above gas pressure may be realized by decreasing the gas pressure outside the apparatus, and/or adjusting a supply pressure of a reactant gas or an amount of a product gas to elevate the gas pressure inside the apparatus.

"An impact directly or indirectly due to the change in gas pressure" means either applying an impact by the change in gas pressure itself or applying an impact via an object to be moved by a kinetic action caused by the change in gas pressure.

The configuration of the apparatus of FIG. 5 is the same as the configuration of the apparatus of FIG. 1 in that the raw material gas supplying pipe 46 is disposed so as to penetrate the interior portion of the lid 44 from the side face of the lid, but different in that the position penetrating the bottom face of the lid is in the vicinity of the heater 30, and the discharging pipe 48 is disposed so as to penetrate the inner wall of the bottom part of the reaction section 33.

The hydrogen producing apparatus 21 of FIG. 5 is connected to a system 121 for discharging and recovering a solid product produced by the direct decomposition reaction of a hydrocarbon using a nickel-based metal structure 29.

The discharging and recovering system 121 of FIG. 5 includes the first channel 22 communicating horizontally the reaction section 33 and the depressurization chamber 23, the depressurization pump 25 communicating the depressurization chamber 23, the ventilation hole 24 on the way of the first channel 22 and valve 26 opening and closing this, and further the system includes the collection box 28 communicating with the lower opening 43 located at the lowest point of the shooter section 35 without valve.

According to the system 121, the impact applying member 34 and the nickel-based metal structure 29 keep a gap with the spring 32 when the ventilation hole 24 is closed and the hydrogen producing apparatus 21 is in operation, whereas the impact applying member 34 may act to touch the upper end of the nickel-based metal structure 29 due to the change in the gas pressure caused by discharging a gas filled in the reaction section 33 to the outside of the reaction section 33 when the ventilation hole 24 is opened, and eventually when the gas pressure becomes equal to the outside of the reaction section 33, the restoring force of the spring 32 may act to return to the position where the original gap is kept. Therefore, repeating periodically or at any timing the operations of: (K) closing the valve 26; (L) reducing a gas pressure in the depressurization chamber 23 with the depressurization pump 25; and (M) opening the valve 26, an impact of the impact applying member 34 is applied in each time to the nickel-based metal structure 29 to cause a separated solid product to slip over the shooter section 35 as necessary and fall down from the lower opening 43 of the reaction chamber by gravity and be recovered in the collection box 28. After storing a solid product to some extent in the collection box, the reaction furnace is shut down to recover the solid product. In at least one embodiment, the system of FIG. 5 is a system suitable for a small-size hydrogen producing apparatus compared to the system of FIG. 1.

Figure 6:
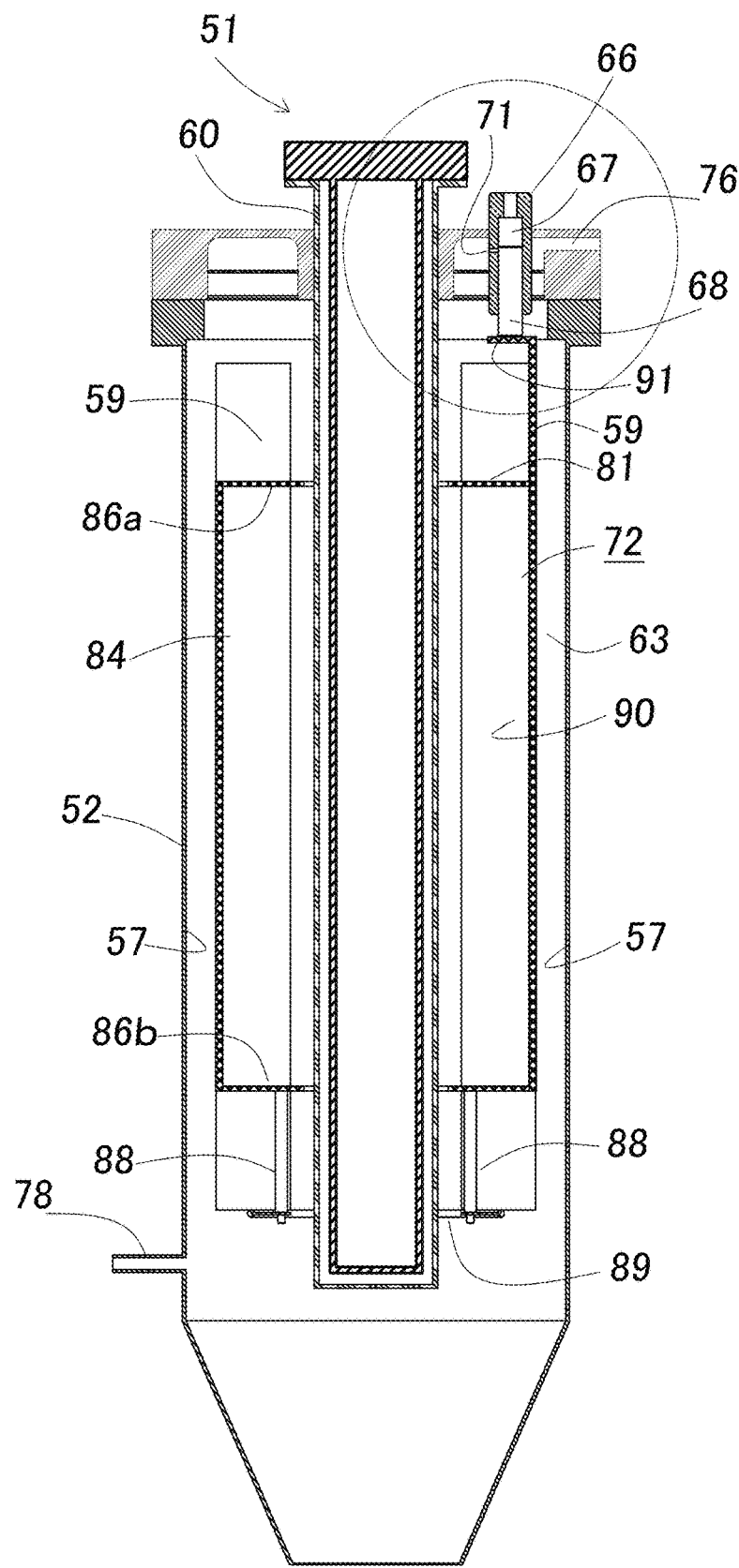
FIG. 6 is a schematic view of a hydrogen producing apparatus according to at least one embodiment.

The hydrogen producing apparatus 51 of FIG. 6 is different from the hydrogen producing apparatus 21 of FIG. 5 in that a cylinder 66 is disposed in a channel of the raw material gas supplying pipe 76 to operate by the supply pressure of raw material gas, nickel-based metal structure 59 is mounted in the rack 72 hanging in the reaction container 52, and the piston 68 defining the cylinder chamber 67 together with the cylinder 66 is configured to apply a swinging force to the rack 72.

Figure 8A:
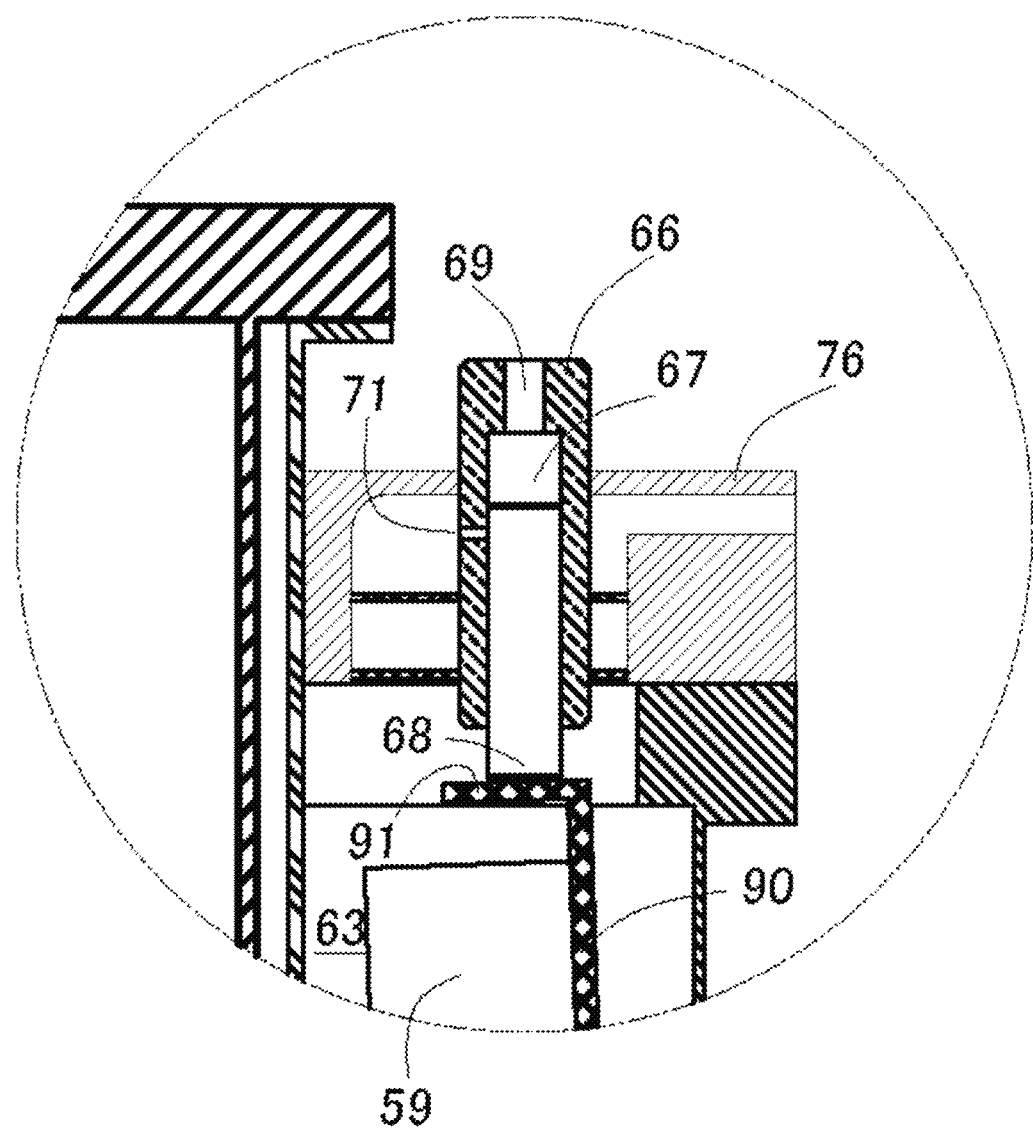
FIG. 8A is an expanded view of a state of the inclination of a rack in an initial stage of the inflow of a reaction gas into a cylinder in a hydrogen producing apparatus according to at least one embodiment.

FIG. 8A shows a detailed structure of the cylinder 66. The side of the cylinder 66 has a degassing hole 71 so that the cylinder chamber 67 and the reaction section 63 may communicate with each other when the piston 68 moves down to the lowest point. Specifically, the cylinder 66 is configured to supply raw material gas in a system other than the raw material gas supplying pipe 76.

Figure 7A:
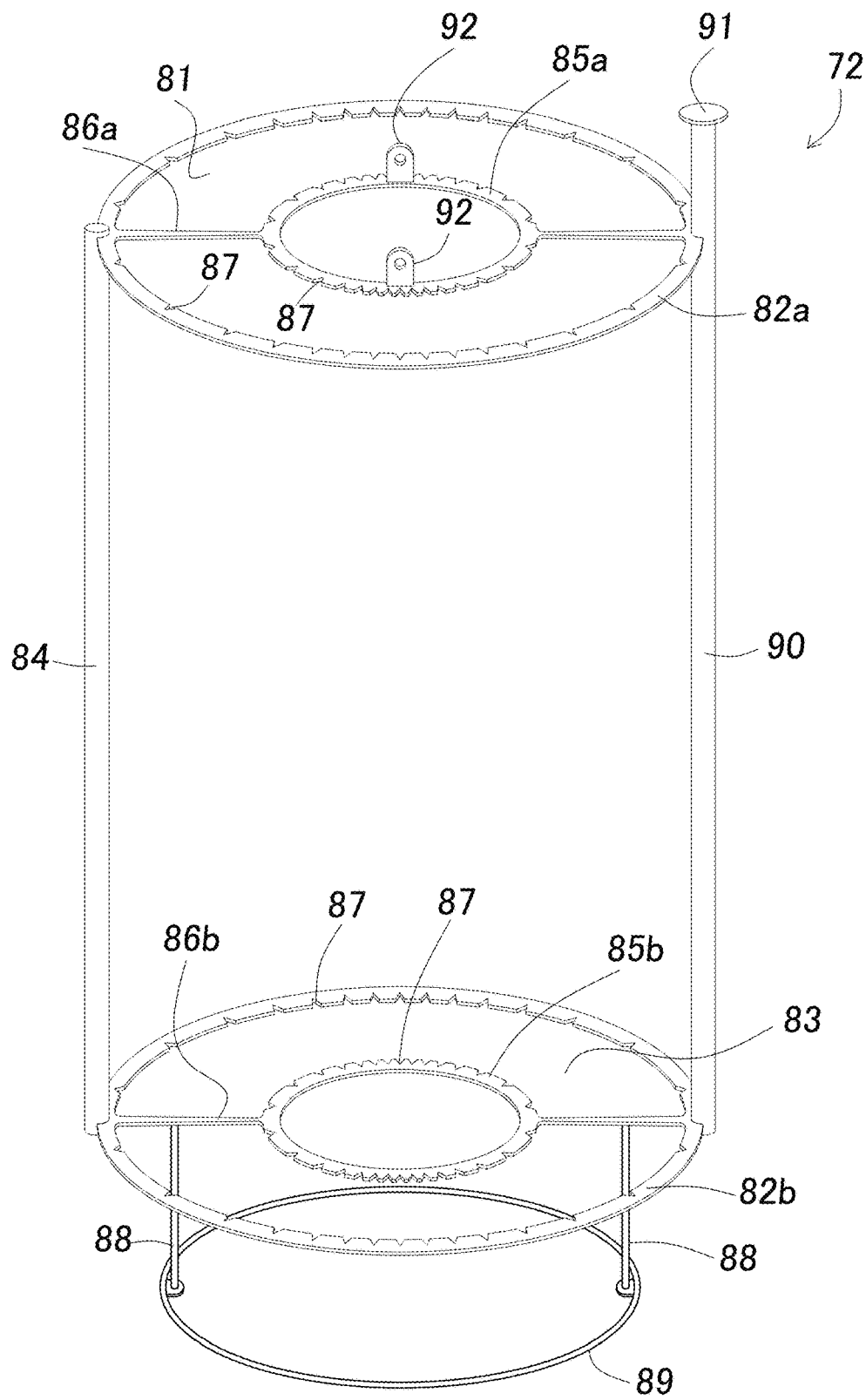
FIG. 7A is a perspective view of a rack used for hydrogen producing apparatus according to at least one embodiment.

Rack 72 shown in FIG. 7A generally has a cylindrical contour, and has a structure in which the large-diameter rings 82a, 82b at the upper end 81 and the bottom end 83 are connected to each other by two poles 84, 90 extending in a vertical direction. The large-diameter ring 82 is integrated with a small-diameter ring 85 having an inner diameter larger than an outer diameter of heater container 60 in a same plane via bridge 86. The large-diameter ring 82 shares its center with the small-diameter ring 85. For each ring, thirty notched grooves 87 in total are formed at regular intervals radially from the center (in a radial direction). From the middle of the bridge 86b on the end face 83 extending downward are two poles 88. At the bottom end of the poles 88, the scaffold ring 89 is hanging down on the same axis as the large-diameter ring 82b and the small-diameter ring 85b. In addition, the pole 90 extends upward in a vertical direction beyond the level of the upper end 81. The upper end of the pole comprises the piston-touching flange 91. The bearing 92 is disposed as a swinging fulcrum on the small diameter ring 85a. The rack 72 is supported by a pole that is not shown in the figure but fixed to the reaction container 52 and/or the heater container 60 to allow for swinging around the pole.

Figure 7B:
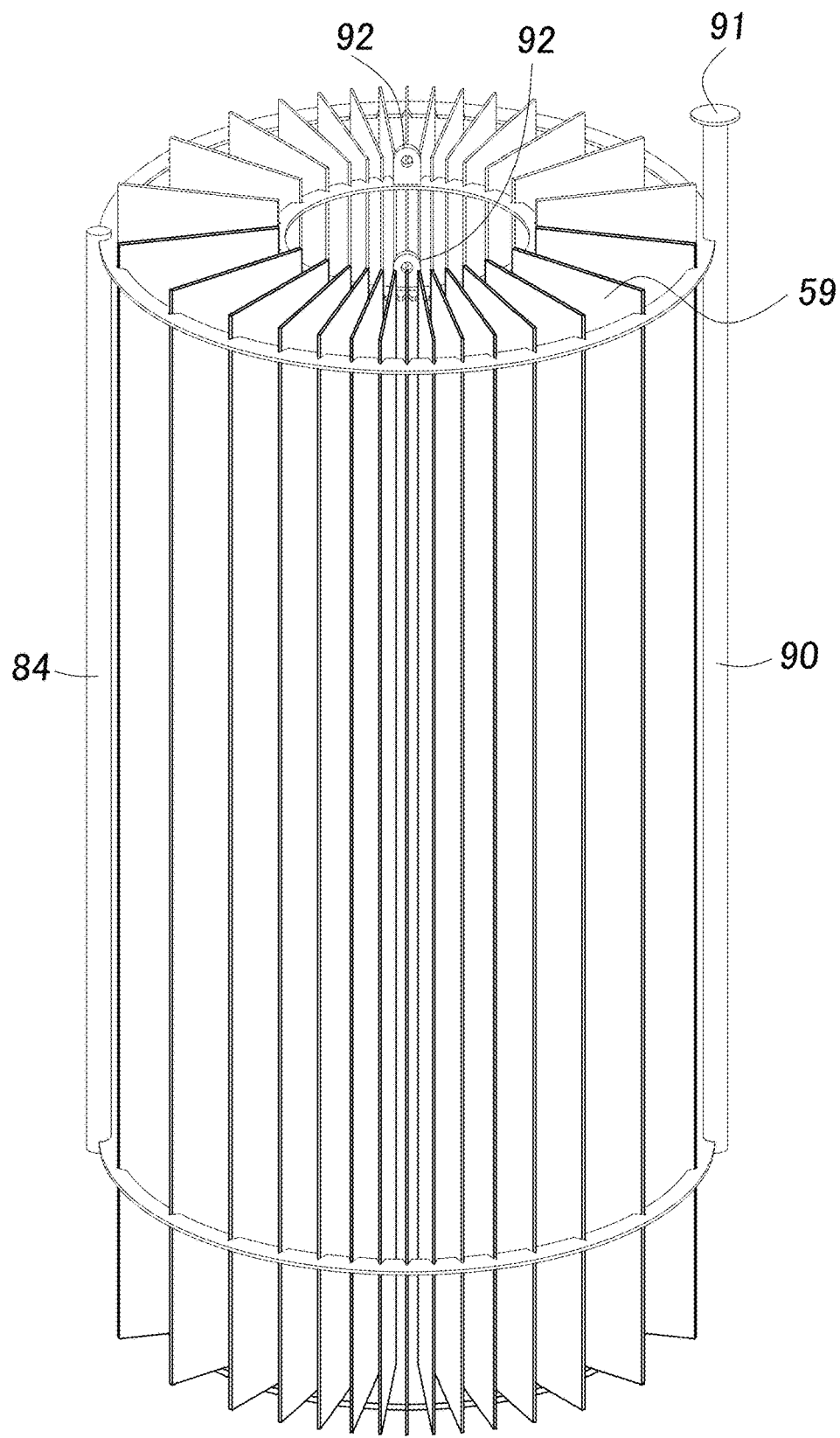
FIG. 7B is a perspective view of a state where a nickel structure is mounted on a rack used for hydrogen producing apparatus according to at least one embodiment.

FIG. 7B shows the state in which thirty pieces of nickel-based metal structures 59 are contained so as to engage in the notched grooves 87 from the upper end 81 of the rack 72. Here, the nickel-based metal structure 59 has a plate thickness thinner than the notched groove 87, and a plate width is almost equal to a distance between notched grooves 87 of the large-diameter ring 82 and the small-diameter ring 85, a plate height is slightly longer than a distance from the upper end 81 of the rack 72 to the scaffold ring 89. This prevents the positional shift or drop of the nickel-based metal structure 59 even if the rack 72 be somewhat swung or inclined.

The relationship between the movement of the piston 68 and the position of the rack 72 will be explained in the following.

Figure 8B:
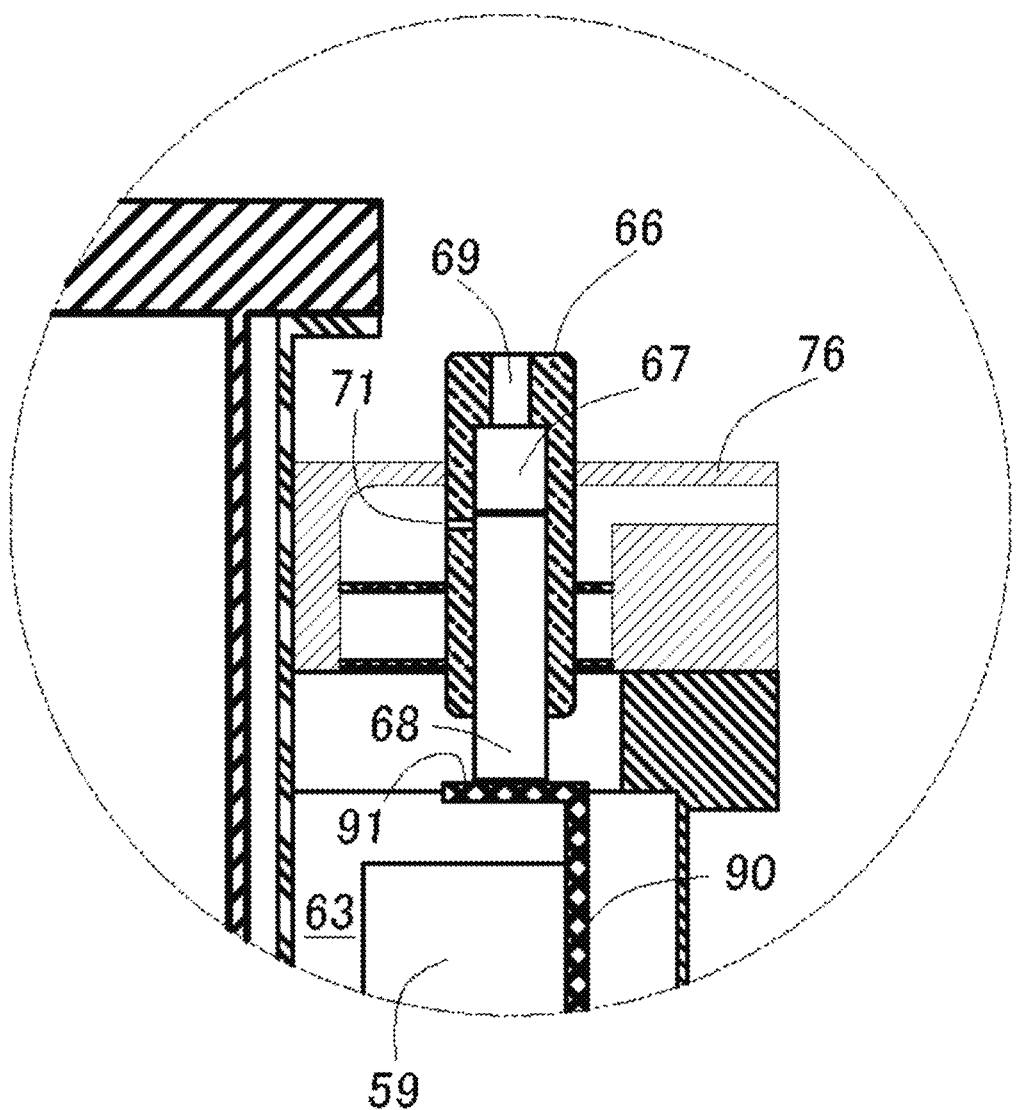
FIG. 8B is an expanded view of a state of the inclination of a rack when a reaction gas is filled into a cylinder to some extent in a hydrogen producing apparatus according to at least one embodiment.
Figure 8C:
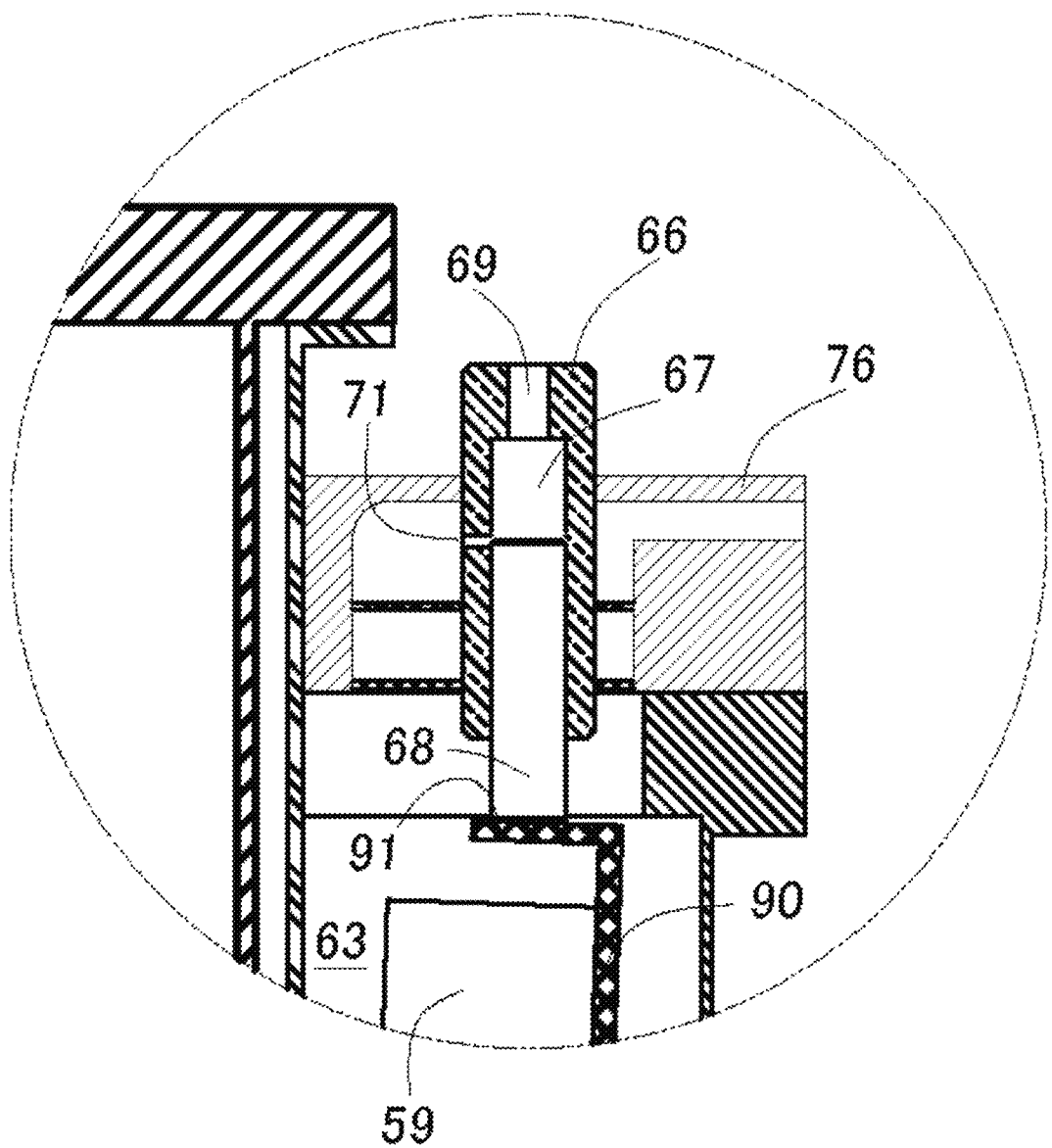
FIG. 8C is an expanded view of a state of the inclination of a rack when a reaction gas is the most filled in a cylinder in a hydrogen producing apparatus according to at least one embodiment.

In a condition that the cylinder chamber 67 is not filled with a reaction gas, the rack 72 is inclined so that the upper end 81 turns left when viewed in FIG. 6. As a result, the bottom end of the pole 90 touches the inner wall 57 of the reaction container 52 (standard position). A method for inclining the rack in advance may include, for example, a method for mounting a weight on the bridge 86a. In this process, the bottom end of the piston 68 is elevated while constantly touching the piston-touching flange 91. As the reaction gas is gradually introduced into the cylinder 66 via the raw material gas supplying pipe 69, a gas pressure inside the cylinder chamber 67 gets increased, and the drop of the piston 68 begins. At a position shown in FIG. 8A, the bottom end of the piston 68 touches with a piston-touching flange 91 of the rack 72. Further supplying raw material gas via the raw material gas supplying pipe 69, the bottom face of the piston 68 gradually slides down the piston-touching flange 91 to get in contact with the upper face of the piston-touching flange 91 as shown in FIG. 8B. At the time, the position of the rack 72 has been changed into a state where the central axis of the pole 90 is in a vertical direction. Further supplying raw material gas to increase the gas pressure in the cylinder chamber 67, the cylinder chamber 67 communicates with the reaction section 63, and the bottom end of the pole 84 gets in touch with the inner wall 57 of the reaction container 52, as shown in FIG. 8C. At the time, a reaction gas is rapidly discharged from the degassing hole 71 to the reaction section 63. Due to the rapid decrease in an inner pressure of the cylinder chamber 67 and weight bias, the piston 68 returns to the position of FIG. 8A.

According to the above rack, in a case of maintaining the supplying rate of the reaction gas to the cylinder chamber 67, the piston 68 goes back and forth the stages of FIG. 8A and FIG. 8C. As a result, when viewed in FIG. 6, the inner wall 57 in the left side of the reaction container 52 is repeatedly shoved by the bottom end of the pole 84. The impact is propagated through the whole rack 72 via the pole 84, eventually to the mounted nickel-based metal structure 59 to cause the fine adhered product produced by the reaction to shake out. Further, the supply of the reaction gas to the cylinder 66 may be intermittently implemented when an impact needs to be intermittently applied, or may be continuously implemented during operation when an impact needs to be applied in a sustained manner. In either case, an effective impact may be applied without any adverse effect on the reaction for utilizing the reaction gas.

On the other hand, when stopping the supply of the reaction gas to the cylinder 66, should the upper end of the piston 68 be lower than the degassing hole 71, the rack 72 swings to the right by gravity. The piston 68 is also displaced upward, yielding to a force from the rack 72, and finally stopped at the position of FIG. 8A. If the upper end of the piston 68 is higher than the degassing hole 71, the rack 72 holds the position stationary.

Figure 9:
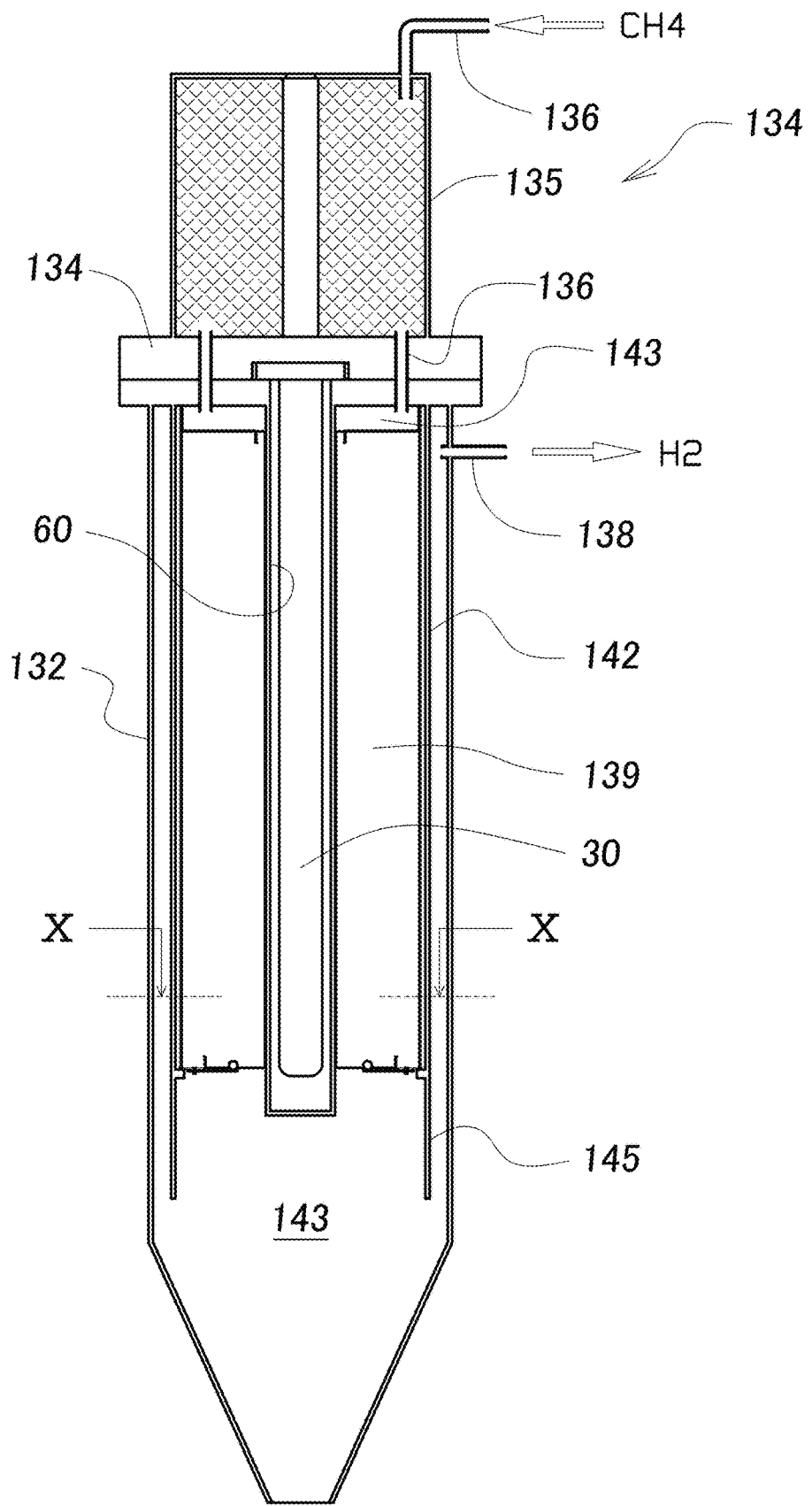
FIG. 9 is a schematic view of a hydrogen producing apparatus configured as a tube-type continuous reactor according to at least one embodiment.

In the hydrogen producing apparatus 131 shown in FIG. 9, a cylindrical rack 142 having a cylindrical circumferential wall with opened upper and bottom ends is adhered to the bottom face of a lid 134 covering a reaction container 132. A nickel-based metal structure 139 is mounted on the cylindrical rack 142. A raw material gas supplying pipe 136 is disposed so as to penetrate the interior portion of the lid 134 from the upper surface of the lid 134 and communicate with the inner space 143 of the cylindrical rack 142. Further, the heat exchanger 135 is disposed on the upper end of the lid 134 so as to cover the raw material gas supplying pipe 136, and the discharging pipe 138 is disposed at the upper end of the inner circumferential wall of the reaction container 132. The configuration functions as a tube-type continuous reactor, allowing the reaction gas to be heated in advance by heat supplied from the heat exchanger 135 in the process of passing through the raw material gas supplying pipe 136 and be introduced into the inner space 143 of the cylindrical rack 142 to flow downward in a vertical direction while keeping in contact with the nickel-based metal structure 139, whereas the produced gas (that may be a mixed gas with a reaction gas) flows upward in a vertical direction to a space defined by a circumferential wall of the inner cylinder 145 of the reaction furnace and an inner wall of the reaction container 132 where no catalyst is present and escapes from the discharging pipe 138 to the outside of the reaction container 132.

Figure 10:
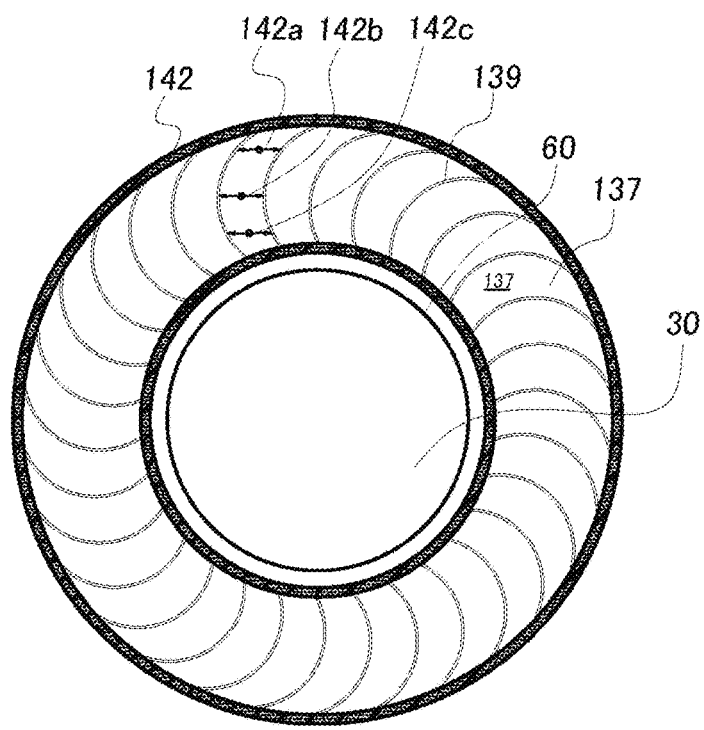
FIG. 10 is an end view taken along the line X-X of FIG. 9 according to at least one embodiment.

The cylindrical rack 142 contains a plurality of nickel-based metal structures 139. In at least one embodiment, when viewed from a cross section orthogonal to a direction flowing a reaction gas as shown in FIG. 10, nickel-based metal structures 139 are disposed in a same direction to be curved with a same curvature, so that the gap between two adjacent nickel-based metal structures may be almost the same interval with any gap measuring positions 144a, 144b, 144c in a radial direction.

In at least one embodiment, the gas channel 137 is limited to an inner space 143 of the cylindrical rack 142, and is a once-through type. Thus, in at least one embodiment, a gas contacts with the whole of nickel-based metal structure 139 at a uniform flow rate in a process of passing gas through. The nickel-based metal structure 139 is disposed to be curved, thereby not causing a flow rate variation, e.g. the flow rate of a gas gets larger as gas flows outward in a radial direction. Thus gas flows downward in a vertical direction at a uniform flow rate, which is particularly suitable for a continuous reactor.

Figure 2:
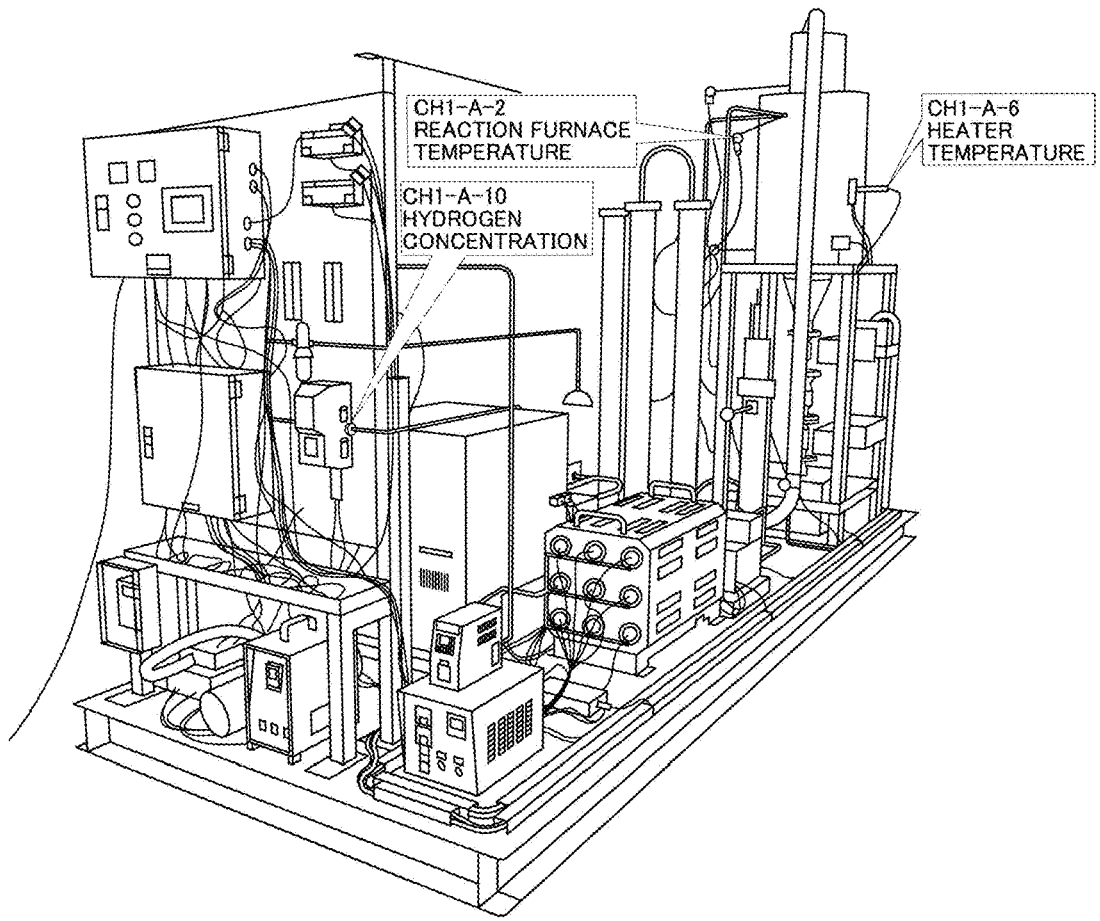
FIG. 2 is a picture of parts for a system according to at least one embodiment.

Example 1—Development of a Prototype of Hydrogen Producing Apparatus T7 and a Temperature-Elevation Test without Catalyst for Two Days In a cylindrical furnace having about 30 L volume of the reaction section and a configuration similar to the hydrogen producing apparatus shown in FIG. 1 and being surrounded by a heater which surrounding was covered with ceramic cylindrical insulator except that a catalyst was not disposed, introduced was methane at a pressure of 0.14 MPa and a flow rate of 3.0 L/min while elevating the temperature of the apparatus. A gas heat conduction-type gas analyzer 1-A-10 (Product number: KD-12C-T1, zero gas: clean air 100%, span gas: hydrogen 100%, zero point unadjusted, manufactured by NEW COSMOS ELECTRIC CO., LTD.) was attached to a pipe for discharging a produced gas to the air to conduct hydrogen concentration measurement, while constantly conducing a temperature measurement by thermocouples 1-A-2 and 1-A-6 disposed in two points shown in FIG. 2. Specifically, hydrogen gas concentration was measured after cooling a produced hydrogen gas down to the room temperature. The gas analyzer 1-A-10 was not intended for measuring hydrogen concentration in methane gas, but for measuring hydrogen concentration in air. Therefore, the initial value was greater, and thus FIG. 3 was prepared by subtracting a background. Further, the direct decomposition reaction of methane has a reaction Gibbs free energy $\Delta Gr$ of 50.8 kJ/mol and an equilibrium constant $K=\exp(-50.8/RT)$ at 900° C. of 0.998, and it is an endoergic reaction. Thus heating proceeds the decomposition reaction without catalyst under Le Chatelier's law.

Figure 3:
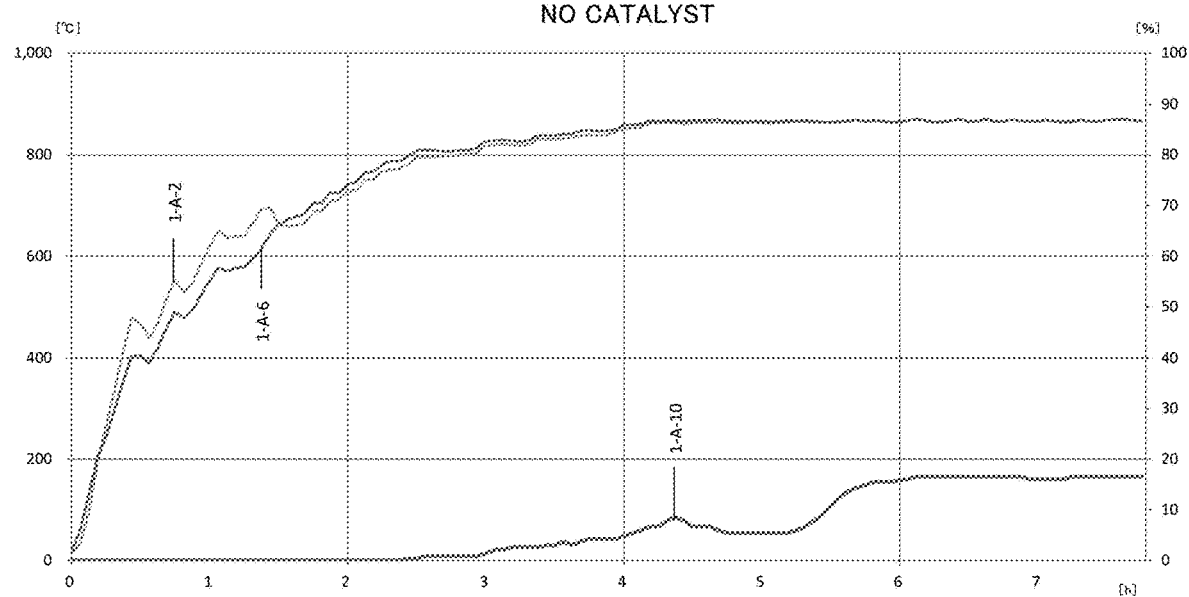
FIG. 3 is a graph of Day 2 of temperature elevation experiment without catalyst according to at least one embodiment.

As shown in FIG. 3 and the following raw data of Table 1 to Table 3, the heater controlling temperature 1-A-6 and the catalyst surface temperature 1-A-2 reached almost 870° C. in five hours or so from the start of heating the apparatus, and were then maintained for three hours or so thereafter. In the meantime, a measurement was made by the gas heat conduction-type gas analyzer 1-A-10, which was found to be stable and maintained over time around 16%. One of ordinary skill would deduce from this that a produced carbon serves as a catalyst. Furthermore, product carbon films were deposited in a furnace.

TABLE 1

2018 Feb. 2 Experiment Day 1

| Time | CH1-A-2[° C.] | CH1-A-6[° C.] | CH1-A-10[%] |
|---|---|---|---|
| 2018 Feb. 2 09:42:11 s | 12.4 | 17.9 | 13.9 |
| 2018 Feb. 2 09:46:11 s | 33.6 | 59.9 | 13.8 |
| 2018 Feb. 2 09:50:11 s | 95.3 | 131.2 | 13.8 |
| 2018 Feb. 2 09:54:11 s | 192.5 | 203.3 | 13.8 |
| 2018 Feb. 2 09:58:11 s | 265.4 | 243.3 | 13.8 |
| 2018 Feb. 2 10:02:11 s | 338.2 | 298.4 | 13.8 |
| 2018 Feb. 2 10:06:11 s | 413.7 | 353.7 | 13.8 |
| 2018 Feb. 2 10:10:11 s | 476.6 | 404.2 | 13.8 |
| 2018 Feb. 2 10:14:11 s | 467.9 | 405.4 | 13.8 |
| 2018 Feb. 2 10:18:11 s | 439.3 | 390.4 | 13.8 |
| 2018 Feb. 2 10:22:11 s | 466.9 | 419.3 | 13.8 |
| 2018 Feb. 2 10:26:11 s | 516.2 | 458.0 | 13.8 |
| 2018 Feb. 2 10:30:11 s | 553.1 | 490.2 | 13.8 |
| 2018 Feb. 2 10:34:11 s | 529.6 | 475.7 | 13.8 |
| 2018 Feb. 2 10:38:11 s | 548.9 | 493.8 | 13.8 |
| 2018 Feb. 2 10:42:11 s | 585.8 | 524.7 | 13.7 |
| 2018 Feb. 2 10:46:11 s | 620.8 | 552.3 | 14.2 |
| 2018 Feb. 2 10:50:11 s | 649.5 | 576.6 | 14.2 |
| 2018 Feb. 2 10:54:11 s | 636.2 | 570.7 | 14.2 |
| 2018 Feb. 2 10:58:11 s | 639.5 | 576.3 | 14.2 |
| 2018 Feb. 2 11:02:11 s | 639.9 | 579.1 | 14.2 |
| 2018 Feb. 2 11:06:11 s | 666.5 | 596.0 | 13.7 |
| 2018 Feb. 2 11:10:11 s | 691.7 | 615.8 | 13.7 |
| 2018 Feb. 2 11:14:11 s | 696.3 | 644.0 | 14.2 |
| 2018 Feb. 2 11:18:11 s | 662.5 | 663.0 | 14.2 |
| 2018 Feb. 2 11:22:11 s | 659.1 | 672.3 | 13.7 |
| 2018 Feb. 2 11:26:11 s | 661.3 | 678.6 | 13.7 |
| 2018 Feb. 2 11:30:11 s | 665.5 | 683.1 | 13.7 |
| 2018 Feb. 2 11:34:11 s | 689.2 | 706.1 | 13.7 |
| 2018 Feb. 2 11:38:11 s | 689.6 | 704.8 | 13.7 |
| 2018 Feb. 2 11:42:11 s | 709.2 | 725.4 | 13.7 |
| 2018 Feb. 2 11:46:11 s | 710.8 | 725.7 | 13.7 |
| 2018 Feb. 2 11:50:11 s | 726.7 | 741.7 | 13.7 |
| 2018 Feb. 2 11:54:11 s | 731.1 | 747.2 | 14.2 |
| 2018 Feb. 2 11:58:11 s | 750.7 | 765.8 | 14.2 |
| 2018 Feb. 2 12:02:11 s | 752.0 | 767.1 | 14.6 |
| 2018 Feb. 2 12:06:11 s | 766.9 | 781.9 | 14.6 |
| 2018 Feb. 2 12:10:11 s | 771.2 | 788.3 | 14.6 |
| 2018 Feb. 2 12:14:11 s | 772.2 | 787.7 | 14.6 |
| 2018 Feb. 2 12:18:11 s | 782.4 | 796.7 | 15.3 |
| 2018 Feb. 2 12:22:11 s | 795.1 | 809.6 | 15.3 |
| 2018 Feb. 2 12:26:11 s | 796.0 | 809.8 | 15.7 |
| 2018 Feb. 2 12:30:11 s | 796.6 | 809.4 | 15.7 |
| 2018 Feb. 2 12:34:11 s | 797.6 | 807.3 | 15.7 |
| 2018 Feb. 2 12:38:11 s | 798.1 | 807.2 | 15.7 |
| 2018 Feb. 2 12:42:11 s | 800.0 | 809.4 | 15.7 |
| 2018 Feb. 2 12:46:11 s | 800.8 | 809.7 | 15.7 |
| 2018 Feb. 2 12:50:11 s | 805.6 | 814.6 | 15.7 |
| 2018 Feb. 2 12:54:11 s | 818.8 | 827.4 | 16.2 |
| 2018 Feb. 2 12:58:11 s | 820.0 | 828.4 | 16.8 |
| 2018 Feb. 2 13:02:11 s | 821.7 | 830.0 | 16.8 |
| 2018 Feb. 2 13:06:11 s | 820.0 | 828.7 | 17.2 |
| 2018 Feb. 2 13:10:11 s | 819.2 | 826.4 | 17.2 |
| 2018 Feb. 2 13:14:11 s | 820.9 | 828.8 | 17.2 |
| 2018 Feb. 2 13:18:11 s | 831.5 | 838.3 | 17.2 |
| 2018 Feb. 2 13:22:11 s | 831.1 | 838.4 | 17.6 |
| 2018 Feb. 2 13:26:11 s | 831.5 | 838.3 | 17.5 |

TABLE 2

'2018 Feb. 2 Experiment Day 1(continued, page 2)

| Time | CH1-A-2[° C.] | CH1-A-6[° C.] | CH1-A-10[%] |
|---|---|---|---|
| 2018 Feb. 2 13:30:11 s | 831.8 | 841.3 | 18.2 |
| 2018 Feb. 2 13:34:11 s | 835.0 | 842.0 | 17.6 |
| 2018 Feb. 2 13:38:11 s | 838.5 | 848.0 | 18.2 |
| 2018 Feb. 2 13:42:11 s | 839.8 | 848.9 | 18.6 |
| 2018 Feb. 2 13:46:11 s | 839.1 | 847.6 | 18.6 |
| 2018 Feb. 2 13:50:11 s | 840.0 | 848.1 | 18.6 |
| 2018 Feb. 2 13:54:11 s | 844.8 | 850.0 | 18.6 |
| 2018 Feb. 2 13:58:11 s | 852.1 | 859.7 | 19.1 |
| 2018 Feb. 2 14:02:11 s | 853.3 | 859.5 | 19.6 |
| 2018 Feb. 2 14:06:11 s | 854.5 | 861.0 | 20.1 |
| 2018 Feb. 2 14:10:11 s | 863.1 | 868.5 | 20.7 |
| 2018 Feb. 2 14:14:11 s | 863.1 | 866.6 | 20.7 |
| 2018 Feb. 2 14:18:11 s | 864.3 | 868.3 | 21.7 |
| 2018 Feb. 2 14:22:11 s | 863.7 | 867.7 | 22.2 |
| 2018 Feb. 2 14:26:11 s | 861.5 | 867.2 | 21.7 |
| 2018 Feb. 2 14:30:11 s | 863.7 | 869.0 | 20.7 |
| 2018 Feb. 2 14:34:11 s | 864.7 | 868.8 | 20.7 |
| 2018 Feb. 2 14:38:11 s | 864.8 | 869.1 | 20.7 |
| 2018 Feb. 2 14:42:11 s | 865.2 | 870.3 | 20.0 |
| 2018 Feb. 2 14:46:11 s | 863.8 | 867.1 | 19.6 |
| 2018 Feb. 2 14:50:11 s | 862.7 | 866.8 | 19.6 |
| 2018 Feb. 2 14:54:11 s | 863.7 | 865.7 | 19.6 |
| 2018 Feb. 2 14:58:11 s | 865.1 | 866.6 | 19.6 |
| 2018 Feb. 2 15:02:11 s | 863.3 | 867.2 | 19.6 |
| 2018 Feb. 2 15:06:11 s | 862.8 | 865.3 | 19.6 |
| 2018 Feb. 2 15:10:11 s | 863.7 | 866.3 | 19.6 |
| 2018 Feb. 2 15:14:11 s | 865.4 | 868.3 | 19.6 |
| 2018 Feb. 2 15:18:11 s | 867.0 | 867.4 | 20.0 |
| 2018 Feb. 2 15:22:11 s | 866.2 | 868.4 | 20.7 |
| 2018 Feb. 2 15:26:11 s | 865.1 | 867.0 | 21.7 |
| 2018 Feb. 2 15:30:11 s | 864.5 | 865.1 | 22.7 |
| 2018 Feb. 2 15:34:11 s | 864.5 | 865.0 | 24.1 |
| 2018 Feb. 2 15:38:11 s | 866.0 | 865.6 | 25.6 |
| 2018 Feb. 2 15:42:11 s | 868.6 | 867.2 | 26.6 |
| 2018 Feb. 2 15:46:11 s | 868.3 | 869.5 | 27.2 |
| 2018 Feb. 2 15:50:11 s | 867.3 | 866.1 | 27.6 |
| 2018 Feb. 2 15:54:11 s | 869.4 | 868.5 | 28.2 |
| 2018 Feb. 2 15:58:11 s | 866.9 | 867.2 | 28.2 |
| 2018 Feb. 2 16:02:11 s | 865.0 | 864.6 | 28.2 |
| 2018 Feb. 2 16:06:11 s | 865.2 | 865.7 | 28.5 |
| 2018 Feb. 2 16:10:11 s | 868.0 | 868.8 | 28.6 |
| 2018 Feb. 2 16:14:11 s | 870.1 | 871.0 | 29.1 |
| 2018 Feb. 2 16:18:11 s | 867.0 | 868.7 | 29.1 |
| 2018 Feb. 2 16:22:11 s | 864.9 | 864.7 | 29.1 |
| 2018 Feb. 2 16:26:11 s | 866.2 | 865.2 | 29.1 |
| 2018 Feb. 2 16:30:11 s | 868.6 | 868.0 | 29.1 |
| 2018 Feb. 2 16:34:11 s | 869.9 | 871.4 | 29.1 |
| 2018 Feb. 2 16:38:11 s | 866.0 | 865.8 | 29.1 |
| 2018 Feb. 2 16:42:11 s | 867.7 | 867.0 | 29.1 |
| 2018 Feb. 2 16:46:11 s | 870.1 | 871.4 | 29.1 |
| 2018 Feb. 2 16:50:11 s | 866.6 | 866.6 | 29.1 |
| 2018 Feb. 2 16:54:11 s | 866.4 | 866.4 | 29.1 |
| 2018 Feb. 2 16:58:11 s | 869.7 | 870.4 | 29.1 |
| 2018 Feb. 2 17:02:11 s | 868.0 | 867.3 | 29.1 |
| 2018 Feb. 2 17:06:11 s | 866.2 | 867.2 | 28.6 |
| 2018 Feb. 2 17:10:11 s | 867.9 | 866.5 | 28.6 |
| 2018 Feb. 2 17:14:11 s | 870.5 | 869.0 | 28.6 |

TABLE 3

'2018 Feb. 2 Experiment Day 1(continued, page 3)

| Time | CH1-A-2[° C.] | CH1-A-6[° C.] | CH1-A-10[%] |
|---|---|---|---|
| 2018 Feb. 2 17:18:11 s | 866.9 | 866.4 | 28.6 |
| 2018 Feb. 2 17:22:11 s | 866.5 | 865.1 | 28.6 |
| 2018 Feb. 2 17:26:11 s | 867.8 | 865.7 | 29.1 |
| 2018 Feb. 2 17:30:11 s | 869.6 | 869.6 | 29.1 |
| 2018 Feb. 2 17:34:11 s | 867.1 | 866.8 | 29.1 |
| 2018 Feb. 2 17:38:11 s | 867.2 | 866.4 | 29.1 |
| 2018 Feb. 2 17:42:11 s | 869.1 | 869.3 | 29.1 |
| 2018 Feb. 2 17:46:11 s | 870.2 | 869.9 | 29.1 |
| 2018 Feb. 2 17:50:11 s | 870.8 | 871.0 | 29.1 |
| 2018 Feb. 2 17:54:11 s | 867.8 | 868.9 | 29.1 |
| 2018 Feb. 2 17:58:11 s | 867.1 | 867.5 | 29.1 |

Example 2—Continuous Temperature Elevating Experiment Using Nickel Porous Body In the same condition as Example 1 except for the use of hydrogen producing apparatus T7 in which a nickel porous body was disposed along an inner wall of the reaction furnace, a temperature elevation experiment was conducted. After the heater temperature reached about 960° C. in four hours from the start of the experiment, the temperature was decreased to about 870° C. and kept for two hours, and then kept at about 800° C. for three hours. Further, hydrogen concentration became almost zero for the initial period of time because a produced gas was usually discharged to the atmosphere, and thus only methane was discharged to the atmosphere until the temperature of the reaction furnace got increased to some extent, and therefore a valve for discharging to the atmosphere was closed. The results are shown in FIG. 4.

Figure 4:
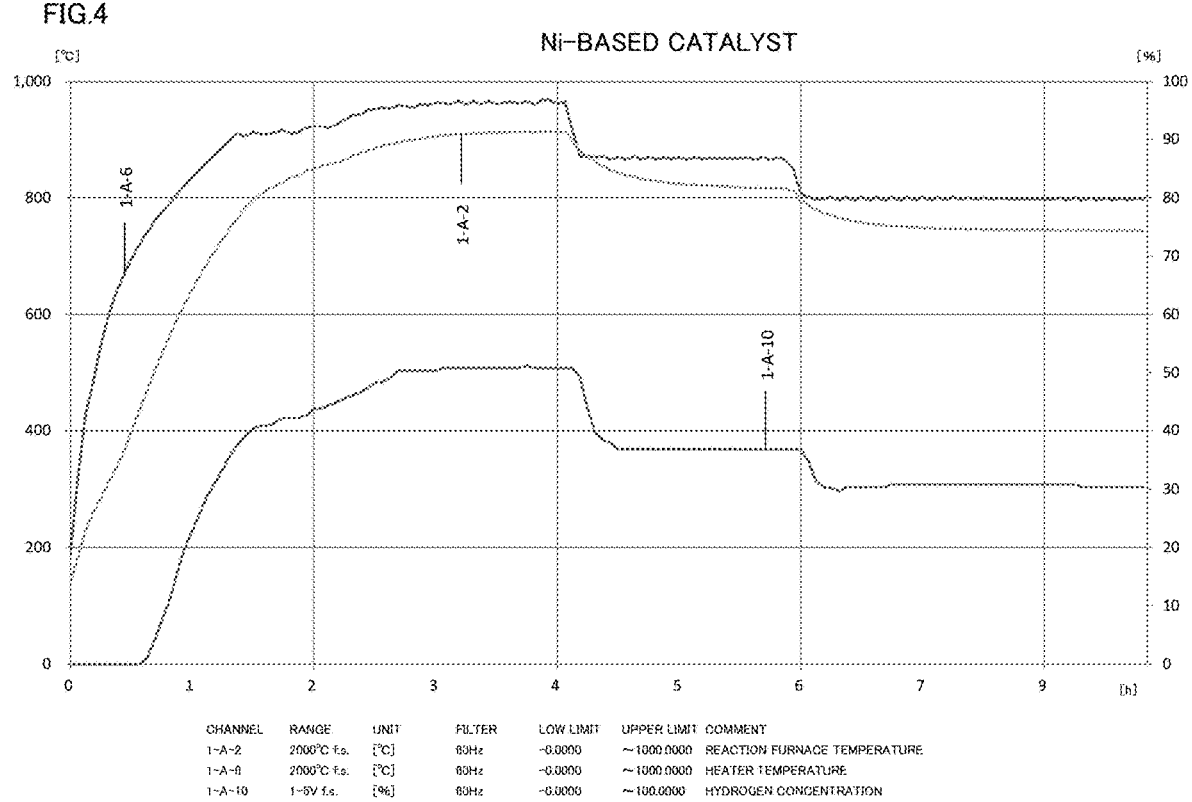
FIG. 4 is a graph of Day 2 of temperature elevation experiment in which a nickel porous body is used as a catalyst according to at least one embodiment.

As shown in FIG. 4, a nickel porous body appears to surprisingly and stably maintain the activity over nine hours or more compared to another nickel particle support method that has been conducted for increasing an exposed surface area in a heterogeneous reaction involving nickel. Further, hydrogen concentration was decreased as the heater temperature got decreased, but could be maintained around 30% even at 800° C. The cause of this is not clear but one of ordinary skill in the art would expect that either a produced carbon serves as a catalyst, or a pore of a carrier supporting the catalyst is not clogged by a produced carbon.

Figure 11:
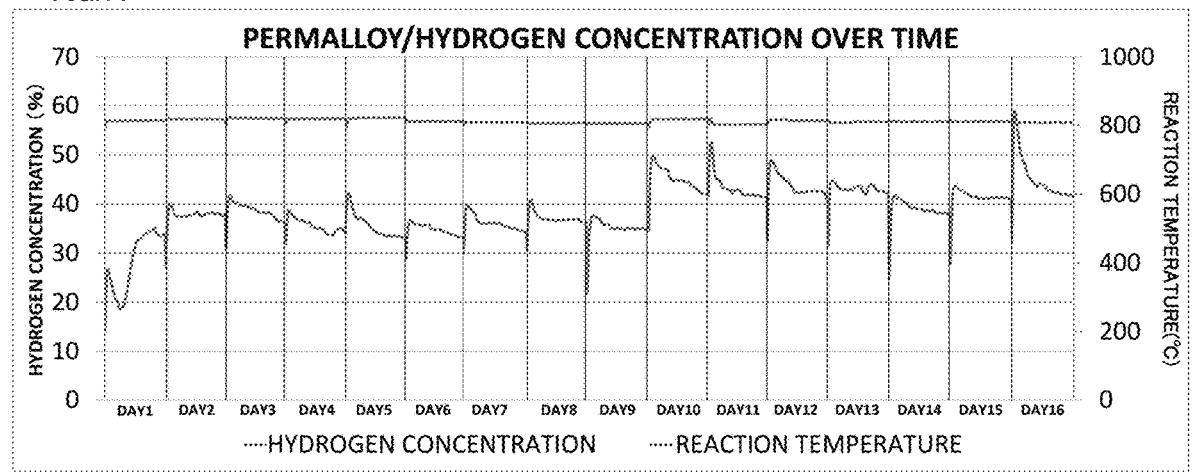
FIG. 11 is a graph of continuous temperature elevation experiment using a permalloy as a catalyst according to at least one embodiment.

Example 3—Continuous Temperature-Elevation Experiment 3 Using a Nickel Permalloy A temperature elevation experiment was conducted in the same condition as Example 2 by use of nickel permalloy (permalloy B, YFN-45-R, manufactured by DOWA METAL CO., LTD.) As a result, compared to the case of using nickel porous body, the result was somewhat inferior in terms of hydrogen concentration up to a heater temperature of about 825° C. and stability at a heater temperature of 950° C. (900° C. for a catalyst surface temperature), however, as shown in FIG. 11, the feasibility of the continuous operation over a period of 16 days at 800° C. was demonstrated.

One of ordinary skill in the art would understand that the embodiments for carrying out the present disclosure are not at all limited to the above explicitly described embodiments. In addition, all the elements explained in the above embodiments are not essential elements for the present disclosure. The present disclosure may go through various modifications insofar as the modifications fall within the technical scope and to the extent that falls within the technical idea. For example, in at least the above embodiments, a nickel-based metal structure is formed into a cylindrical shape having an opening at both ends and the metal structure is positioned at a position along the inner circumferential wall of the reactor in the reactor, taking into account the fact that methane gas is sequentially filled from the upper part to the lower part of the reaction container, and the fact that a produced carbon separates and falls from the catalyst by gravity. Instead, a flat plate catalyst may be disposed or hung in parallel vertically in a reaction section. Further, the discharging and recovering system 121 of FIG. 5 may be connected to the hydrogen producing apparatus 1 of FIG. 1. The discharging and recovering system 101 may be connected to the hydrogen producing apparatus 21 of FIG. 5. Besides, the hydrogen producing apparatus 51 of FIG. 6 is configured to hang a rack (i.e. designing a swinging fulcrum higher than a gravity center) to crash into an inner wall of said reaction chamber. Particularly in a case of a large-size apparatus, a swinging fulcrum may be located at a lower part of the reaction chamber (i.e. a swinging fulcrum may be designed to be lower than a gravity center) to cause a rack to crash into a barrier (a stopper) fixed in a reaction chamber. Further, differing from the hydrogen producing apparatus 51 shown in FIG. 6, the piston may be untouched with the piston-touching flange in a condition where the bottom end of the pole 90 was touched with the inner wall 57 of the reaction container 52. Furthermore, inclining a rack by disposing nickel-based metal structures at irregular intervals to shift a gravity center relative to a swinging fulcrum is possible. Furthermore, in FIG. 10, nickel-based metal structures are disposed in a same direction to be curved with a same curvature, however, in at least one embodiment, as long as the gap between two adjacent nickel-based metal structures may be almost the same interval with any gap measuring positions various shapes depending on a structure of a reaction container are possible.

INDUSTRIAL APPLICABILITY

The hydrogen producing apparatus of the present disclosure may be followed by an apparatus that increases the purity of hydrogen contained in a produced gas, which allows us to apply for hydrogen supply to fuel cell cars equipped with polymer electrolyte fuel cell (PEFC) via on-site station etc.

Further, in recent years, the spotlight is on Solid Oxide Fuel Cell (SOFC) that is capable of directly utilizing methane via city gas infrastructure in addition to hydrogen. In SOFC, there has been a concern regarding the decrease in performance due to an electrode reaction inhibiting effects caused by the precipitation of carbon produced from the thermal decomposition reaction of methane on a metal nickel surface or the adsorption of a produced CO on a metal nickel surface (Satoh et al., "Fuel Cells—From a viewpoint of methane utilization techniques", J. Plasma Fusion Res. Vol. 87, No. 1, (2011) pp. 36-41). The use of the hydrogen producing apparatus of the present disclosure as a fuel modifier disposed in the upstream of SOFC may result in the decrease in precipitated carbon in SOFC or a longer lifetime of the catalyst.

The invention claimed is:

1. A system for discharging and recovering a solid product produced, the system comprising:
   a reaction chamber for performing a direct decomposition reaction of a hydrocarbon;
   a collection box for communicating with an opening of said reaction chamber via a ventilation hole;
   a first valve for opening and closing said ventilation hole; and
   a depressurization pump for reducing a gas pressure in said collection box in response to closing the first valve.

2. The system for discharging and recovering a solid product of claim 1, comprising:
   a depressurization chamber along a channel from said ventilation hole to said collection box,
   a second valve between said depressurization chamber and said collection box, and
   wherein said depressurization chamber is configured to communicate with said collection box.

3. The system for discharging and recovering a solid product of claim 1, wherein said reaction chamber comprises a nickel-based metal structure.

4. The system for discharging and recovering a solid product of claim 1, wherein said nickel-based metal structure comprises an exposed nickel-containing layer, and the nickel-containing layer is an unsupported-type nickel-containing layer.

5. The system for discharging and recovering a solid product of claim 1, wherein said nickel-based metal structure is a structure that combines at least one selected from the group consisting of a plate, a porous body, a felt, a mesh, a fabric and an expanded metal.

6. A process for discharging and recovering solid product produced in a reaction chamber, the process comprising the steps of:

Providing a first valve in a communication channel between the reaction chamber and a collection box;

Depressurizing the inner pressure of the collection box with the first valve being closed; and releasing the first valve.

7. A process for discharging and recovering solid product produced in a reaction chamber, the process comprising the steps of:

providing a depressurization chamber along a channel between the reaction chamber and said collection box;

providing a first valve along the channel between the reaction chamber and the depressurization chamber;

providing a second valve along the channel between the depressurization chamber and the collection box;

reducing an inner pressure of the depressurization chamber with the first valve and the second valve being closed;

opening the first valve to discharge and recover the solid product in the depressurization chamber;

closing the first valve;

reducing an inner pressure of the collection box; and opening the second valve to discharge and recover the solid product in the collection box.

* * * * *